US012793451B2

(12) United States Patent
Ren et al.

(10) Patent No.: US 12,793,451 B2
(45) Date of Patent: Nov. 10, 2026

(54) ZERO-SHOT PROMPT ENSEMBLING FOR ZERO-SHOT CLASSIFICATION WITH TEXT-IMAGE MODELS

(71) Applicant: Google LLC, Mountain View, CA (US)

(72) Inventors: Jie Ren, San Jose, CA (US); Zhe Liu, Mountain View, CA (US); James Urquhart Allingham, Cambridge, MA (US); Michael Ward Dusenberry, Rocklin, CA (US); Dustin Tran, San Francisco, CA (US); Yin Cui, Mountain View, CA (US); Balaji Lakshminarayanan, Mountain View, CA (US); Xiuye Gu, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 317 days.

(21) Appl. No.: 18/421,672

(22) Filed: Jan. 24, 2024

(65) Prior Publication Data

US 2024/0282131 A1 Aug. 22, 2024

Related U.S. Application Data

(60) Provisional application No. 63/481,695, filed on Jan. 26, 2023.

(51) Int. Cl.
*G06V 20/70* (2022.01)
*G06F 40/40* (2020.01)
(Continued)

(52) U.S. Cl.
CPC .............. *G06V 20/70* (2022.01); *G06F 40/40* (2020.01); *G06V 10/761* (2022.01); *G06V 10/764* (2022.01); *G06V 10/776* (2022.01)

(58) Field of Classification Search
CPC .... G06V 20/70; G06V 10/761; G06V 10/764; G06V 10/776; G06V 10/82;
(Continued)

(56) References Cited

U.S. PATENT DOCUMENTS

| | | | | |
|---|---|---|---|---|
| 2023/0334245 | A1* | 10/2023 | Kumar Choubey | G06F 16/35 |
| 2023/0351753 | A1* | 11/2023 | Gorti | G06V 20/47 |
| 2024/0212327 | A1* | 6/2024 | Geng | G06F 40/284 |

OTHER PUBLICATIONS

Zhou, K., Yang, J., Loy, C. C., & Liu, Z. (2022). Learning to prompt for vision-language models. International Journal of Computer Vision, 130(9), 2337-2348; hereafter referred to as Zhou (Year: 2022).*

(Continued)

*Primary Examiner* — Jennifer Mehmood
*Assistant Examiner* — Vaisali Rao Koppolu
(74) *Attorney, Agent, or Firm* — DORITY & MANNING P.A.

(57) ABSTRACT

Systems and methods for zero-shot prompt ensembling for zero-shot classification with text-image models can include utilizing a pre-trained text-image model to perform downstream tasks based on prompt-based weighting. The systems and methods may adjust for frequency-based bias and may automatically determine different prompt associations with a given downstream task. The systems and methods can aggregate weighted text embeddings and then determine a classification output based on similarity measures between an image embedding and the aggregated weighted text embeddings.

21 Claims, 11 Drawing Sheets

200

(51) Int. Cl.
*G06V 10/74* (2022.01)
*G06V 10/764* (2022.01)
*G06V 10/776* (2022.01)

(58) Field of Classification Search
CPC .... G06V 10/7753; G06F 40/40; G06N 3/045; G06N 3/08
See application file for complete search history.

(56) References Cited

OTHER PUBLICATIONS

Radford, A., Kim, J. W., Hallacy, C., Ramesh, A., Goh, G., Agarwal, S., . . . & Sutskever, I. (Jul. 2021). Learning transferable visual models from natural language supervision. In International conference on machine learning (pp. 8748-8763). PmLR (Year: 2021).*
J. Xie and S. Zheng, "Zero-shot Object Detection Through Vision-Language Embedding Alignment," 2022 IEEE International Conference on Data Mining Workshops (ICDMW), Orlando, FL, USA, 2022, pp. 1-15, doi: 10.1109/ICDMW58026.2022.00121 (Year: 2022).*
Berg et al., "A Prompt Array Keeps the Bias Away: Debiasing Vision Language Models with Adversarial Learning", arXiv:2203.11933v3, 17 pages.
Extended European Search Report for Application No. EP 24154047.5, mailed May 31, 2024, 8 pages.
Allingham et al., "Sparse MoEs meet Efficient Ensembles.", arXiv:2110.03360v2, Jul. 9, 2023.
Best et al., "The Ratio of Observed-to-Expected Mortality as a Quality-of-Care Indicator in Non-Surgical VA Patients.", Medical care, vol. 32, Issue 4, 1994, pp. 390-400.
Bossard et al., "Food-101—Mining Discriminative Components with Random Forests.", European Conference on Computer Vision, 2014, 16 pages.
Brown et al., "Language Models are Few-Shot Learners.", arXiv:2005.14165v4, Jul. 22, 2020, 75 pages.
Casella et al., "Statistical Inference.", Cengage Learning, 2021, 686 pages.
Cheng et al., "Remote Sensing Image Scene Classification: Benchmark and State of the Art.", Institute of Electrical and Electronics Engineers, vol. 105, No. 10, Oct. 2017, pp. 1865-1883.
Cherti et al., "Reproducible Scaling Laws for Contrastive Language-Image Learning.", arXiv:2212.07143v1, Dec. 14, 2022, 39 pages.
Cimpoi et al., "Describing Textures in the Wild.", arXiv:1311.3618v2, Nov. 15, 2013, 13 pages.
Dosovitskiy et al., "An Image is Worth 16x16 Words: Transformers for Image Recognition at Scale.", arXiv:2010.11929v2, Jun. 3, 2021, 22 pages.
Fei-Fei et al., "Learning Generative Visual Models from Few Training Examples: An Incremental Bayesian Approach Tested on 101 Object Categories.", 2004 Conference on Computer Vision and Pattern Recognition Workshop, Washington, DC, United States, 2004, pp. 9 pages.
Gao et al., "Making Pre-trained Language Models Better Few-shot Learners.", arXiv:2012.15723v2, Jun. 2, 2021, 15 pages.
Ge et al., "Improving Zero-shot Generalization and Robustness of Multi-modal Models.", arXiv:2212.01758v2, May 25, 2023, 11 pages.
GitHub.com, "A. Big Vision.", 2024, https://github.com/google-research/ big_vision, retrieved on Jan. 24, 2024, 9 pages.
GitHub.com, "Flax: A Neural Network Library and Ecosystem for JAX.", http://github.com/google/flax, retrieved on Jan. 24, 2024, 6 pages.
GitHub.com, "JAX: Composable Transformations of Python+ NumPy Programs.", http://github.com/google/jax, retrieved on Jan. 24, 2024, 8 pages.
Helber et al., "EuroSAT: A Novel Dataset and Deep Learning Benchmark for Land Use and Land Cover Classification.", arXiv:1709.00029v2, Feb. 1, 2019.
Hendrycks et al., "Natural Adversarial Examples.", arXiv:1907.07174v4, Mar. 4, 2021, 16 pages.
Hendrycks et al., "Scaling Out-of-Distribution Detection for Real-World Settings.", arXiv:1911.11132v4, May 15, 2022, 14 pages.
Hendrycks et al., The Many Faces of Robustness: A Critical Analysis of Out-of-Distribution Generalization., arXiv:2006.16241v3, Jul. 24, 2021, 18 pages.
Jia et al., "Scaling Up Visual and Vision-Language Representation Learning with Noisy Text Supervision.", arXiv:2102.05918v2, Jun. 11, 2021, 14 pages.
Jones, "A Statistical Interpretation of Term Specificity and its Application in Retrieval.", Journal of Documentation, vol. 28, No. 1, 1972, pp. 11-21.
King, "Unifying Political Methodology: The Likelihood Theory of Statistical Inference.", Cambridge University Press, 1989, 4 pages.
Krause et al., "3D Object Representations for Fine-Grained Categorization.", 2013 Institute of Electrical and Electronics Engineers International Conference on Computer Vision Workshops, Sydney, NSW, Australia, Dec. 2-8, 2013, 8 pages.
Krizhevsky, "Learning Multiple Layers of Features from Tiny Images.", Technical Report, 2009, 60 pages.
MacQueen, "Classification and Analysis of Multivariate Observations.", Fifth Berkeley Symposium on Mathematical Statistics and Probability, vol. 1: Statistics, 1967, pp. 281-297.
Nado et al., "Uncertainty Baselines: Benchmarks for Uncertainty & Robustness in Deep Learning.", arXiv:2106.04015v3, Jan. 5, 2022, 13 pages.
Nilsback et al., "Automated Flower Classification over a Large Number of Classes.", 2008 Sixth Indian Conference on Computer Vision, Graphics and Image Processing, Bhubaneswar, India, Dec. 16-19, 2008, 8 pages.
Parkhi et al., "Cats and Dogs.", 2012 Institute of Electrical and Electronics Engineers Conference on Computer Vision and Pattern Recognition, Providence, Rhode Island, United States, Jun. 16-21, 2012, 8 pages.
Pham et al., "Combined Scaling for Zero-shot Transfer Learning.", arXiv:2111.10050v3, Apr. 12, 2023, 47 pages.
Radford et al., "Learning Transferable Visual Models from Natural Language Supervision.", arXiv:2103.00020v1, Feb. 26, 2021, 48 pages.
Recht et al., "Do ImageNet Classifiers Generalize to ImageNet?", arXiv:1902.10811v2, Jun. 12, 2019, 76 pages.
Ren et al., "A Simple Fix to Mahalanobis Distance for Improving Near-OOD Detection.", arXiv:2106.09022v1, Jun. 16, 2021, 8 pages.
Ren et al., "Likelihood Ratios for Out-of-Distribution Detection.", arXiv:1906.02845v2, Dec. 5, 2019, 21 pages.
Ren et al., "Out-of-Distribution Detection and Selective Generation for Conditional Language Models.", arXiv:2209.15558v2, Mar. 7, 2023, 32 pages.
Rousseeuw et al., "Alternatives to the Median Absolute Deviation.", Journal of the American Statistical Association, vol. 88, No. 424, Dec. 1993, pp. 1273-1283, 11 pages.
Rubin et al., "Learning to Retrieve Prompts for In-Context Learning.", arXiv:2112.08633v2, May 8, 2022, 17 pages.
Russakovsky et al., "ImageNet Large Scale Visual Recognition Challenge.", arXiv:1409.0575v3, Jan. 30, 2015, 43 pages.
Schuhmann et al., "LAION-400M: Open Dataset of CLIP-Filtered 400 Million Image-Text Pairs.", arXiv:2111.02114v1, Nov. 3, 2021, 5 pages.
Shin et al., "AutoPrompt: Eliciting Knowledge from Language Models with Automatically Generated Prompts.", arXiv:2010.15980v2, Nov. 7, 2020, 15 pages.
Shu et al., "Test-Time Prompt Tuning for Zero-Shot Generalization in Vision-Language Models.", arXiv:2209.07511v1, Sep. 15, 2022, 20 pages.
Sorensen et al., "An Information-theoretic Approach to Prompt Engineering Without Ground Truth Labels.", arXiv:2203.11364v1, Mar. 21, 2022, 44 pages.
Wang et al., "Learning Robust Global Representations by Penalizing Local Predictive Power.", arXiv:1905.13549v2, Nov. 5, 2019, 19 pages.

(56) References Cited

OTHER PUBLICATIONS

Xiao et al., "SUN database: Large-scale Scene Recognition from Abbey to Zoo.", 2010 Institute of Electrical and Electronics Engineers Computer Society Conference on Computer Vision and Pattern Recognition, San Francisco, California, United States, Jun. 13-18, 2010, 8 pages.
Zhai et al., "LiT: Zero-Shot Transfer with Locked-image Text Tuning.", arXiv:2111.07991v3, Jun. 22, 2022, 26 pages.
Zhou et al., "Conditional Prompt Learning for Vision-Language Models.", arXiv:2203.05557v2, Oct. 6, 2022, 11 pages.
Zhou et al., "Large Language Models are Human-Level Prompt Engineers.", arXiv:2211.01910v2, Mar. 10, 2023, 43 pages.
Zhou et al., "Learning to Prompt for Vision-Language Models.", arXiv:2109.01134v6, Oct. 6, 2022, 13 pages.

* cited by examiner

ZERO-SHOT PROMPT ENSEMBLING FOR ZERO-SHOT CLASSIFICATION WITH TEXT-IMAGE MODELS

RELATED APPLICATIONS

The present application is based on and claims priority to U.S. Provisional Application No. 63/481,695 having a filing date of Jan. 26, 2023. Applicant claims priority to and the benefit of each of such application and incorporate all such application herein by reference in its entirety.

FIELD

The present disclosure relates generally to zero-shot prompt ensembling for zero-shot classification with text-image models. More particularly, the present disclosure relates to classifying images with a pre-trained text-image model by pairing and processing candidate classification labels with a plurality of prompts and weighting the outputs based on a determined score for the respective prompt.

BACKGROUND

Contrastively trained text-image models can be able to perform zero-shot classification. For example, the trained text-image models may be able to classify previously unseen images into categories that the model has never been explicitly trained to identify. However, the zero-shot classifiers may rely on prompt engineering to achieve high accuracy and robustness. The prompt engineering may rely on hand crafting a set of prompts for individual downstream tasks.

The hand crafting can be tedious and may lead to biased prompts. Bias can occur due to a lack of information related to the catalog of proper prompts and/or based on biased prompt phrasing.

SUMMARY

Aspects and advantages of embodiments of the present disclosure will be set forth in part in the following description, or can be learned from the description, or can be learned through practice of the embodiments.

One example aspect of the present disclosure is directed to a computing system. The system can include one or more processors and one or more non-transitory computer-readable media that collectively store instructions that, when executed by the one or more processors, cause the computing system to perform operations. The operations can include obtaining an image and a plurality of candidate text labels. The plurality of candidate text labels can be associated with a particular task. The operations can include obtaining a plurality of prompts. The plurality of prompts can be associated with a phrase to provide with a classification output. The operations can include processing the image with an image embedding model to generate an image embedding. The operations can include processing each of the plurality of candidate text labels with each of the plurality of prompts with a text embedding model to generate a plurality of text embedding sets. In some implementations, each text embedding set can be associated with a different prompt of the plurality of prompts. Each text embedding set can include a particular text embedding associated with a particular candidate text label of the plurality of candidate text labels. The operations can include determining a score for each respective prompt of the plurality of prompts. The operations can include generating a plurality of weighted text representations based on the plurality of text embeddings sets and the plurality of respective scores. In some implementations, each weighted text representation can be associated with a respective prompt of the plurality of prompts and a respective candidate text label of the plurality of candidate text labels. The operations can include determining an image classification based on the plurality of weighted text representations and the image embedding. The image classification can include a selected candidate text label of the plurality of candidate text labels.

In some implementations, determining the score for each respective prompt of the plurality of prompts can include determining a similarity measure between a text embedding set of a respective prompt and the image embedding. The similarity measure can include an average embedding similarity between the text embeddings of the text embedding set and the image embedding. In some implementations, determining the score for each respective prompt of the plurality of prompts can include obtaining a control image. The control image may differ from the image. Determining the score for each respective prompt of the plurality of prompts can include processing the control image with the image embedding model to generate a control image embedding. The score can be generated based on the image embedding, the control image embedding, and a respective text embedding set for the respective prompt.

In some implementations, the operations can include obtaining a pre-trained image-text model. The pre-trained image-text model can include a foundation model pre-trained on a training dataset without a specific downstream task. The pre-trained image-text model can include the text embedding model and the image embedding model. In some implementations, the training dataset can include a plurality of image-caption training examples. The operations can include providing the image classification as an output. The plurality of prompts can include a plurality of caption templates. In some implementations, the plurality of caption templates can be configured to be augmented to comprise a classification label and be descriptive of an example caption for an input image. The plurality of candidate text labels can be descriptive of a plurality of candidate object classifications.

Another example aspect of the present disclosure is directed to a computer-implemented method. The method can include obtaining, by a computing system including one or more processors, input data. The input data can be descriptive of one or more images. The method can include obtaining, by the computing system, a plurality of candidate text labels and a prompt. The plurality of candidate text labels can be descriptive of a plurality of candidate classifications. The method can include generating, by the computing system, a plurality of text strings based on the plurality of candidate text labels and the prompt. Each of the plurality of text strings can be generated by augmenting the prompt with a candidate text label of the plurality of candidate text labels. The method can include processing, by the computing system, each text string of the plurality of text strings with a text embedding model to generate a plurality of text embeddings. In some implementations, each text embedding of the plurality of text embeddings can be associated with a respective text string. The method can include processing, by the computing system, the input data with an image embedding model to generate an image embedding. The method can include determining, by the computing system, a prompt score based on a similarity measure between the image embedding and the plurality of text embeddings. The method can include generating, by the computing system, a plurality of weighted text embeddings based on the prompt score and the plurality of text embeddings. The method can include determining, by the computing system, a classification output based at least in part on the plurality of weighted text embeddings.

In some implementations, determining the classification output can include determining, by the computing system, a similarity measure associated with each weighted text embedding of the plurality of weighted text embeddings based on the image embedding and the plurality of weighted text embeddings. The method can include obtaining, by the computing system, a second prompt. The second prompt can differ from the prompt. The method can include generating, by the computing system, a plurality of second weighted text embeddings based on the second prompt and the plurality of text embeddings and determining, by the computing system, an adjusted text embedding for a particular candidate text label of the plurality of candidate text labels based on a respective weighted text embedding of the plurality of weighted text embeddings and a respective second weighted text embedding of the plurality of second weighted text embeddings. The classification output can be determined based on a similarity measure associated with the adjusted text embedding and the image embedding. In some implementations, the text embedding model can include a text encoder. The image embedding model can include an image encoder. The text embedding model and the image embedding model may have been pre-trained on a training dataset. In some implementations, the training dataset can include a plurality of text-image pairs. Each text-image pair can include an image and a respective caption. The text embedding model and the image embedding model may have been trained based on a bi-directional contrastive loss.

Another example aspect of the present disclosure is directed to one or more non-transitory computer-readable media that collectively store instructions that, when executed by one or more computing devices, cause the one or more computing devices to perform operations. The operations can include obtaining input data. The input data can be descriptive of one or more images. The operations can include obtaining a plurality of candidate text labels and a prompt. The plurality of candidate text labels can be descriptive of a plurality of candidate classifications. The operations can include generating a plurality of text strings based on the plurality of candidate text labels and the prompt. Each of the plurality of text strings can be generated by augmenting the prompt with a candidate text label of the plurality of candidate text labels. The operations can include processing each text string of the plurality of text strings with a text embedding model to generate a plurality of text embeddings. In some implementations, each text embedding of the plurality of text embeddings can be associated with a respective text string. The operations can include processing the input data with an image embedding model to generate an input image embedding. The operations can include obtaining a control image. The control image can differ from the one or more images of the input data. The operations can include processing the control image with an image embedding model to generate a control image embedding. The operations can include determining a prompt score based on the input image embedding, the control image embedding, and the plurality of text embeddings. The operations can include generating a plurality of weighted text embeddings based on the prompt score and the plurality of text embeddings. The operations can include determining a classification output based at least in part on the plurality of weighted text embeddings.

In some implementations, determining the prompt score can include determining a first similarity measure based on the input image embedding and the plurality of text embeddings, determining a second similarity measure based on the control image embedding and the plurality of text embeddings, and determining the prompt score based on a difference between the first similarity measure and the second similarity measure. The plurality of weighted text embeddings can be generated based on softmax weighting across a plurality of prompt text embedding sets. The operations can include generating a plurality of probability predictions for the plurality of candidate text labels based on the plurality of weighted text embeddings and the image embedding. In some implementations, the classification output can be determined based on the plurality of probability predictions.

Another example aspect of the present disclosure is directed to a computing system. The system can include one or more processors and one or more non-transitory computer-readable media that collectively store instructions that, when executed by the one or more processors, cause the computing system to perform operations. The operations can include obtaining an image. The operations can include processing the image with an image embedding model to generate an image embedding. The operations can include obtaining a plurality of text embedding sets. The plurality of text embedding sets may have been generated based on processing a plurality of candidate text labels with a plurality of prompt templates with a text embedding model. In some implementations, each text embedding set can be associated with a different prompt template of the plurality of prompt templates. The operations can include determining a score for each respective prompt template of the plurality of prompt templates based on a respective text embedding set for the respective prompt template. The operations can include generating a plurality of weighted text representations based on the plurality of text embeddings sets and the plurality of respective scores. Each weighted text representation can be associated with a respective prompt of the plurality of prompts and a respective candidate text label of the plurality of candidate text labels. The operations can include determining an image classification based on the plurality of weighted text representations and the image embedding. The image classification can include a selected candidate text label of the plurality of candidate text labels.

The systems and methods can automatically generate and/or utilize prompts. The systems and methods can improve the zero-shot accuracy and robustness through prompt ensembling. The systems and methods disclosed herein can process a large pool of prompts to automatically score the prompts that are most suitable for a particular downstream dataset, which can lead to a competitive or even better performance of hand-crafted prompts. In some implementations, prompt scoring methods can be included to weigh the importance of prompts, and the use of the weighting in the systems and methods can be able to achieve competitive and even better performance than with hand crafted prompts. The systems and methods can be zero-shot, learning free, and the scores can be interpretable.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
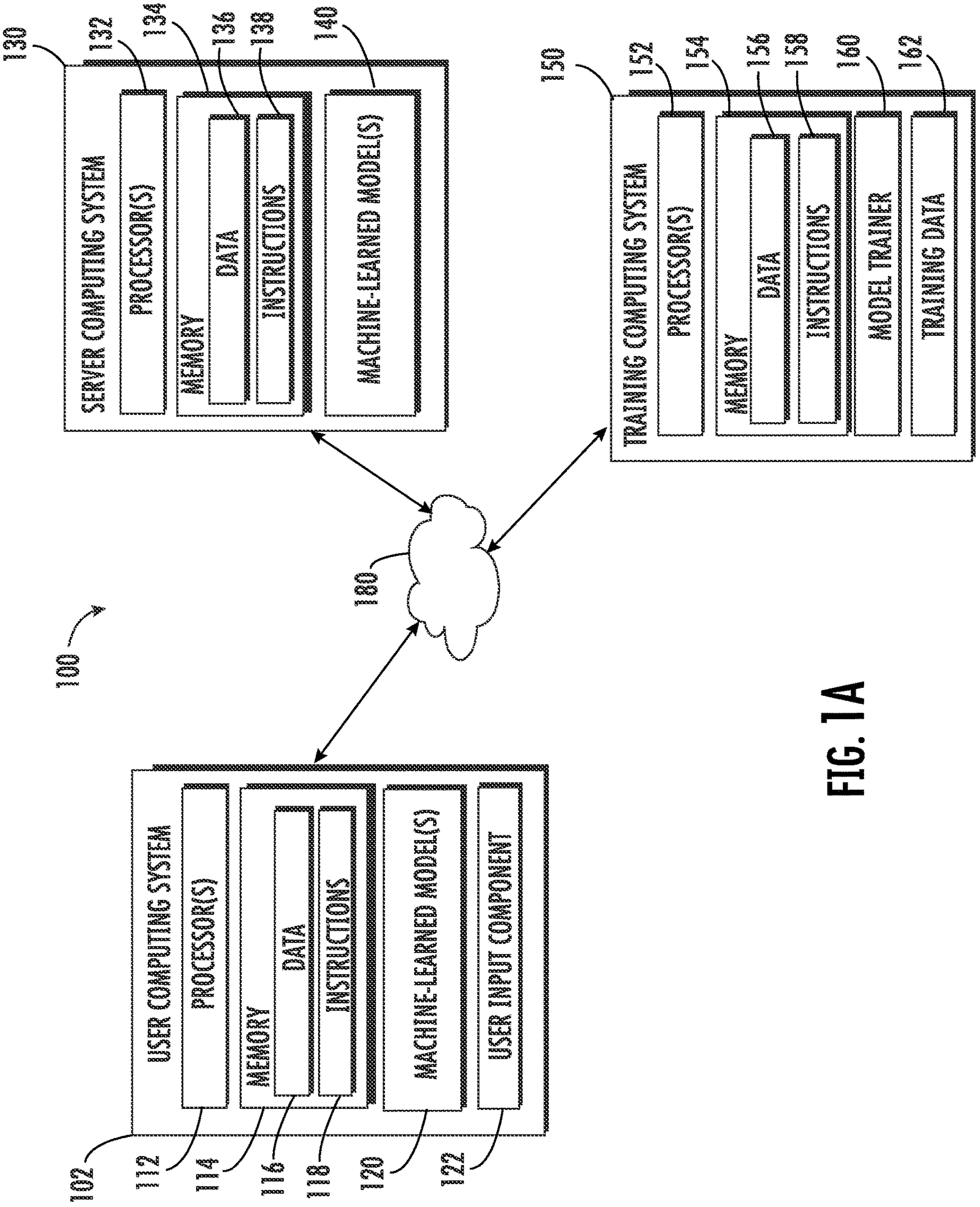
FIG. 1A depicts a block diagram of an example computing system that performs prompt ensembling for classification with text-image models according to example embodiments of the present disclosure.

Reference numerals that are repeated across plural figures are intended to identify the same features in various implementations.

DETAILED DESCRIPTION

Overview

Generally, the present disclosure is directed to systems and methods for utilizing prompt ensembling for performing downstream tasks with a pre-trained text-image model. In particular, the systems and methods disclosed herein can leverage zero-shot prompt ensembling for zero-shot classification with pre-trained text-image models. The systems and methods can include scoring prompts based on generated text embeddings generated based on the prompt. The prompt score can then be utilized to weight the generated text embeddings. The text embeddings associated with a particular text classification label can be aggregated after weighting. The aggregated weighted text embedding can be compared against other aggregated weighted embeddings to determine a classification for an input image. The systems and methods can utilize an additional image (e.g., a control image) to adjust for potential frequency bias of the pre-trained text-image model.

For example, the systems and methods can include obtaining an image and a plurality of candidate text labels. The plurality of candidate text labels can be associated with a particular task. The systems and methods can include obtaining a plurality of prompts. The plurality of prompts can be associated with a phrase to provide with a classification output. The systems and methods can include processing the image with an image embedding model to generate an image embedding. The systems and methods can include processing each of the plurality of candidate text labels with each of the plurality of prompts with a text embedding model to generate a plurality of text embedding sets. In some implementations, each text embedding set can be associated with a different prompt of the plurality of prompts. Each text embedding set can include a particular text embedding associated with a particular candidate text label of the plurality of candidate text labels. The systems and methods can include determining a score for each respective prompt of the plurality of prompts. The systems and methods can include generating a plurality of weighted text representations based on the plurality of text embeddings sets and the plurality of respective scores. In some implementations, each weighted text representation can be associated with a respective prompt of the plurality of prompts and a respective candidate text label of the plurality of candidate text labels. The systems and methods can include determining an image classification based on the plurality of weighted text representations and the image embedding. The image classification can include a selected candidate text label of the plurality of candidate text labels.

The systems and methods can obtain an image and a plurality of candidate text labels. The plurality of candidate text labels can be associated with a particular task. The plurality of candidate text labels can be descriptive of a plurality of candidate object classifications. The image can depict one or more objects in a scene. The plurality of candidate text labels can be associated with a plurality of candidate object classifications. The plurality of object classifications may be obtained and/or determined based on a coarse classification (e.g., an object type detection), a context, and/or other determination. For example, a vehicle may be detected, which can cause vehicle classification labels to be obtained for processing. Alternatively and/or additionally, an animal may be detected, which can cause animal classification labels to be obtained for processing. Alternatively and/or additionally, the plurality of candidate text labels may be generalized for a plurality of different downstream tasks, which may include objects of different object types and/or actions of different action types.

The systems and methods can obtain a plurality of prompts. The plurality of prompts can be associated with a phrase to provide with a classification output. In some implementations, the plurality of prompts can include a plurality of caption templates. The plurality of caption templates can be configured to be augmented to include a classification label and be descriptive of an example caption for an input image. The plurality of prompts may be obtained from a database and/or may be generated with a generative model (e.g., an autoregressive language model, a vision language model, a generative image captioning model, and/or other generative models). The plurality of prompts may be obtained and/or determined based on the image, the plurality of candidate text labels, a context, a task, and/or based on preliminary processing. Alternatively and/or additionally, the plurality of prompts may be associated with a plurality of different tasks, contexts, object types, and/or other uses.

The systems and methods can process the image with an image embedding model to generate an image embedding. The image embedding model can include one or more machine-learned encoder models that may be pre-trained to generate image embeddings. The image embedding model may be jointly trained with a text embedding model such that images and texts associated with a similar topic can be processed to generate similar embeddings. The image embedding can be descriptive of one or more image features of the image (e.g., object features).

The systems and methods can process each of the plurality of candidate text labels with each of the plurality of prompts with a text embedding model to generate a plurality of text embedding sets. Each text embedding set can be associated with a different prompt of the plurality of prompts. In some implementations, each text embedding set can include a particular text embedding associated with a particular candidate text label of the plurality of candidate text labels. For example, the systems and methods can process the plurality of candidate text labels and the plurality of prompts to generate a plurality candidate caption sets. Each candidate caption set can be associated with a particular prompt of the plurality of prompts, and each of the plurality of candidate caption sets can include a candidate caption with each of the plurality of candidate text labels. In some implementations, the text embedding model may be jointly trained with the image embedding model. The text embedding model may be pre-trained to generate a text embedding associated with one or more text features. In some implementations, the image embedding model and the text embedding model may be jointly trained with image-caption pairs. The image-caption pairs can include a plurality of training images and a plurality of respective training captions.

The systems and methods can determine a score for each respective prompt of the plurality of prompts. In some implementations, determining the score for each respective prompt of the plurality of prompts can include determining a similarity measure between a text embedding set of a respective prompt and the image embedding. The similarity measure can include an average embedding similarity between the text embeddings of the text embedding set and the image embedding.

Alternatively and/or additionally, determining the score for each respective prompt of the plurality of prompts can include obtaining a control image. The control image can differ from the image. Determining the score for each respective prompt of the plurality of prompts can include processing the control image with the image embedding model to generate a control image embedding. In some implementations, the score can be generated based on the image embedding, the control image embedding, and a respective text embedding set for the respective prompt.

The systems and methods can generate a plurality of weighted text representations based on the plurality of text embeddings sets and the plurality of respective scores. Each weighted text representation can be associated with a respective prompt of the plurality of prompts and a respective candidate text label of the plurality of candidate text labels.

The systems and methods can determine an image classification based on the plurality of weighted text representations and the image embedding. The image classification can include a selected candidate text label of the plurality of candidate text labels.

In some implementations, the systems and methods can obtain a pre-trained image-text model. The pre-trained image-text model can include a foundation model pre-trained on a training dataset without a specific downstream task. The pre-trained image-text model can include the text embedding model and the image embedding model. The training dataset can include a plurality of image-caption training examples. The pre-trained image-text model can include a generative model (e.g., a generative language model (e.g., a vision language model)). The foundation model may be pre-trained on a large training dataset to train and/or tune billions of machine-learned model parameters.

Additionally and/or alternatively, the systems and methods can provide the image classification as an output. The image classification may be provided as an output in isolation and/or as part of a larger generative model output, which may include processing the image classification with a generative language model to generate a generative model response conditioned based on the image classification.

The systems and methods can include obtaining input data. The input data can be descriptive of one or more images. The systems and methods can include obtaining a plurality of candidate text labels and a prompt. The plurality of candidate text labels can be descriptive of a plurality of candidate classifications. The systems and methods can include generating a plurality of text strings based on the plurality of candidate text labels and the prompt. Each of the plurality of text strings can be generated by augmenting the prompt with a candidate text label of the plurality of candidate text labels. The systems and methods can include processing each text string of the plurality of text strings with a text embedding model to generate a plurality of text embeddings. In some implementations, each text embedding of the plurality of text embeddings can be associated with a respective text string. The systems and methods can include processing the input data with an image embedding model to generate an image embedding. The systems and methods can include determining a prompt score based on a similarity measure between the image embedding and the plurality of text embeddings. The systems and methods can include generating a plurality of weighted text embeddings based on the prompt score and the plurality of text embeddings. The systems and methods can include determining a classification output based at least in part on the plurality of weighted text embeddings.

The systems and methods can obtain input data. The input data can be descriptive of one or more images. The input data can be obtained from a user computing system. In some implementations, the input data can be obtained from and/or generated with a user computing device (e.g., a mobile computing device (e.g., a smart phone, a smart wearable, etc.)). The input data may include image data, audio data, text data, latent encoding data, signal data, multimodal data, and/or other data. The input data may be obtained based on user selections and/or may be continually obtained as part of a feed of data intake.

The systems and methods can obtain a plurality of candidate text labels and a prompt. The plurality of candidate text labels can be descriptive of a plurality of candidate classifications. The plurality of candidate text labels can be associated with fine-grained classifications of objects, locations, contexts, and/or actions. The plurality of candidate text labels may be determined based on a set of highly rated classifications and/or may be obtained from a database. The prompt can include a template associated with a particular task (e.g., a captioning task and/or a response task).

The systems and methods can generate a plurality of text strings based on the plurality of candidate text labels and the prompt. Each of the plurality of text strings can be generated by augmenting the prompt with a candidate text label of the plurality of candidate text labels. The plurality of text strings can include the plurality of candidate text labels in the template of the prompt.

The systems and methods can process each text string of the plurality of text strings with a text embedding model to generate a plurality of text embeddings. Each text embedding of the plurality of text embeddings can be associated with a respective text string. The text embedding model can include a text encoder.

The systems and methods can process the input data with an image embedding model to generate an image embedding. The image embedding model can include an image encoder. In some implementations, the text embedding model and the image embedding model may have been pre-trained on a training dataset. The training dataset can include a plurality of text-image pairs. Each text-image pair can include an image and a respective caption. Additionally and/or alternatively, the text embedding model and the image embedding model may have been trained based on a bi-directional contrastive loss.

The systems and methods can determine a prompt score based on a similarity measure between the image embedding and the plurality of text embeddings. The prompt score may be based on an embedding value distance. In some implementations, the prompt score may be weighted based on a determined training dataset bias and/or a determined concept frequency bias.

The systems and methods can generate a plurality of weighted text embeddings based on the prompt score and the plurality of text embeddings. The text embeddings can be weighted based on an aggregate score for the prompt. The process can be repeated for each of a plurality of different prompts, which can be leveraged to adjust candidate classification scores based on the aggregate score of the associated with prompt.

The systems and methods can determine a classification output based at least in part on the plurality of weighted text embeddings. In some implementations, determining the classification output can include determining a similarity measure associated with each weighted text embedding of the plurality of weighted text embeddings based on the image embedding and the plurality of weighted text embeddings.

In some implementations, the systems and methods can obtain a second prompt. The second prompt can differ from the prompt. The systems and methods can generate a plurality of second weighted text embeddings based on the second prompt and the plurality of text embeddings. Additionally and/or alternatively, the systems and methods can determine an adjusted text embedding for a particular candidate text label of the plurality of candidate text labels based on a respective weighted text embedding of the plurality of weighted text embeddings and a respective second weighted text embedding of the plurality of second weighted text embeddings. The classification output may be determined based on a similarity measure associated with the adjusted text embedding and the image embedding.

The systems and methods can include obtaining input data. The input data can be descriptive of one or more images. The systems and methods can include obtaining a plurality of candidate text labels and a prompt. The plurality of candidate text labels can be descriptive of a plurality of candidate classifications. The systems and methods can include generating a plurality of text strings based on the plurality of candidate text labels and the prompt. Each of the plurality of text strings can be generated by augmenting the prompt with a candidate text label of the plurality of candidate text labels. The systems and methods can include processing each text string of the plurality of text strings with a text embedding model to generate a plurality of text embeddings. In some implementations, each text embedding of the plurality of text embeddings can be associated with a respective text string. The systems and methods can include processing the input data with an image embedding model to generate an input image embedding. The systems and methods can include obtaining a control image. The control image can differ from the one or more images of the input data. The systems and methods can include processing the control image with an image embedding model to generate a control image embedding. The systems and methods can include determining a prompt score based on the input image embedding, the control image embedding, and the plurality of text embeddings. The systems and methods can include generating a plurality of weighted text embeddings based on the prompt score and the plurality of text embeddings. The systems and methods can include determining a classification output based at least in part on the plurality of weighted text embeddings.

The systems and methods can obtain input data. The input data can be descriptive of one or more images. The input data can be associated with one or more features (e.g., image features associated with an object, a location, a context, and/or an action). The input data may include an image and a question associated with the image (e.g., "what is depicted in this image?", "what is this object?", "what is happening?", "how do I use this?", etc.). The one or more images can depict an environment that includes one or more objects, one or more locations, and/or one or more contexts (e.g., time of day, a weather state, and/or lighting).

The systems and methods can obtain a plurality of candidate text labels and a prompt. The plurality of candidate text labels may be descriptive of a plurality of candidate classifications. The plurality of candidate text labels can be associated with instance level classifications, which can be descriptive of a specific object classification for a particular object within one or more object types. The plurality of candidate text labels may be obtained from a database and/or generated with one or more machine-learned models.

The systems and methods can generate a plurality of text strings based on the plurality of candidate text labels and the prompt. Each of the plurality of text strings can be generated by augmenting the prompt with a candidate text label of the plurality of candidate text labels. The prompt can be associated with a caption template and/or a response template. The prompt may be obtained from a database and/or generated with a machine-learned model (e.g., a generative model (e.g., a large language model)). The caption template and/or response template may include one or more sentences with a token to be replaced with the candidate text labels. The response template may be obtained and/or generated based on a received question from the input data.

The systems and methods can process each text string of the plurality of text strings with a text embedding model to generate a plurality of text embeddings. Each text embedding of the plurality of text embeddings can be associated with a respective text string. The plurality of text embeddings can be associated with features of the respective text strings. The plurality text embeddings can map the text strings to an embedding space for search, similarity evaluation, learning distributions, and/or clustering.

The systems and methods can process the input data with an image embedding model to generate an input image embedding. The input image embedding can map the input image to the embedding space for caption and/or response determination. In some implementations, the input image and the question may be processed with an embedding model to generate an input embedding associated with the multimodal input.

The systems and methods can obtain a control image. The control image can differ from the one or more images of the input data. The control image can be a randomly selected image, a constant image, and/or an image determined to differ from the input image. The control image may be obtained to identify and/or adjust for biases. The biases may be based on the pre-trained model training dataset and/or other biases.

The systems and methods can process the control image with an image embedding model to generate a control image embedding. The control image embedding can map the control image to the embedding space for caption and/or response determination.

The systems and methods can determine a prompt score based on the input image embedding, the control image embedding, and the plurality of text embeddings. In some implementations, determining the prompt score can include determining a first similarity measure based on the input image embedding and the plurality of text embeddings, determining a second similarity measure based on the control image embedding and the plurality of text embeddings, and determining the prompt score based on a difference between the first similarity measure and the second similarity measure.

The systems and methods can generate a plurality of weighted text embeddings based on the prompt score and the plurality of text embeddings. In some implementations, the plurality of weighted text embeddings can be generated based on softmax weighting across a plurality of prompt text embedding sets.

The systems and methods can determine a classification output based at least in part on the plurality of weighted text embeddings. The classification output may include a text string that includes a high scoring prompt with a high scoring candidate text label.

In some implementations, the systems and methods can generate a plurality of probability predictions for the plurality of candidate text labels based on the plurality of weighted text embeddings and the image embedding. The classification output may be determined based on the plurality of probability predictions.

The systems and methods of the present disclosure provide a number of technical effects and benefits. As one example, the system and methods can provide competitive and/or better performance on downstream tasks when compared to handcrafted prompt engineering. In particular, the systems and methods disclosed herein can utilize prompt ensembling with prompt-based output weighting for downstream tasks to circumvent a reliance on handcrafting prompts for downstream tasks with text-image models.

Another technical benefit of the systems and methods of the present disclosure is the ability to leverage control image based processing to provide bias-aware scoring for the prompts to adjust the weighting of the outputs to reduce the bias propagation in output generation. For example, the training of the pre-trained text-image model may generate biases in the outputs of the text-image model. Utilizing a control image for score adjustment and/or generation can reduce the propagation of the learned bias.

Another example of technical effect and benefit relates to improved computational efficiency and improvements in the functioning of a computing system. For example, the systems and methods disclosed herein can leverage prompt ensembling with weighted outputs to reduce the computational costs of classification tasks as the systems and methods can be less computationally expensive when compared to classification model training and/or retraining for specific classes.

With reference now to the Figures, example embodiments of the present disclosure will be discussed in further detail.

Example Devices and Systems

FIG. 1A depicts a block diagram of an example computing system 100 that performs prompt ensembling for classification with text-image models according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more text-image models 120. For example, the text-image models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example text-image models 120 are discussed with reference to FIGS. 2-5.

In some implementations, the one or more text-image models 120 can be received from the server computing system 130 over network 180, stored in the user computing device memory 114, and then used or otherwise implemented by the one or more processors 112. In some implementations, the user computing device 102 can implement multiple parallel instances of a single text-image model 120 (e.g., to perform parallel zero-shot classification across multiple instances of users requesting predictions for downstream tasks).

More particularly, the text-image model 120 may be pre-trained on a large training dataset to generate a foundational model that can then be utilized for tasks when conditioned based on one or more prompts. In some implementations, the input for the text-image model may be generated using one or more prompt ensembling techniques.

Additionally or alternatively, one or more text-image models 140 can be included in or otherwise stored and implemented by the server computing system 130 that communicates with the user computing device 102 according to a client-server relationship. For example, the text-image models 140 can be implemented by the server computing system 130 as a portion of a web service (e.g., a classification service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned text-image models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-5.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the text-image models 120 and/or 140 based on a set of training data 162. The training data 162 can include, for example, a large training dataset for a plurality of downstream tasks to pre-train the text-image model 120. In some implementations, the training data 162 can include a plurality of training examples that include an image and a respective caption for the image.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
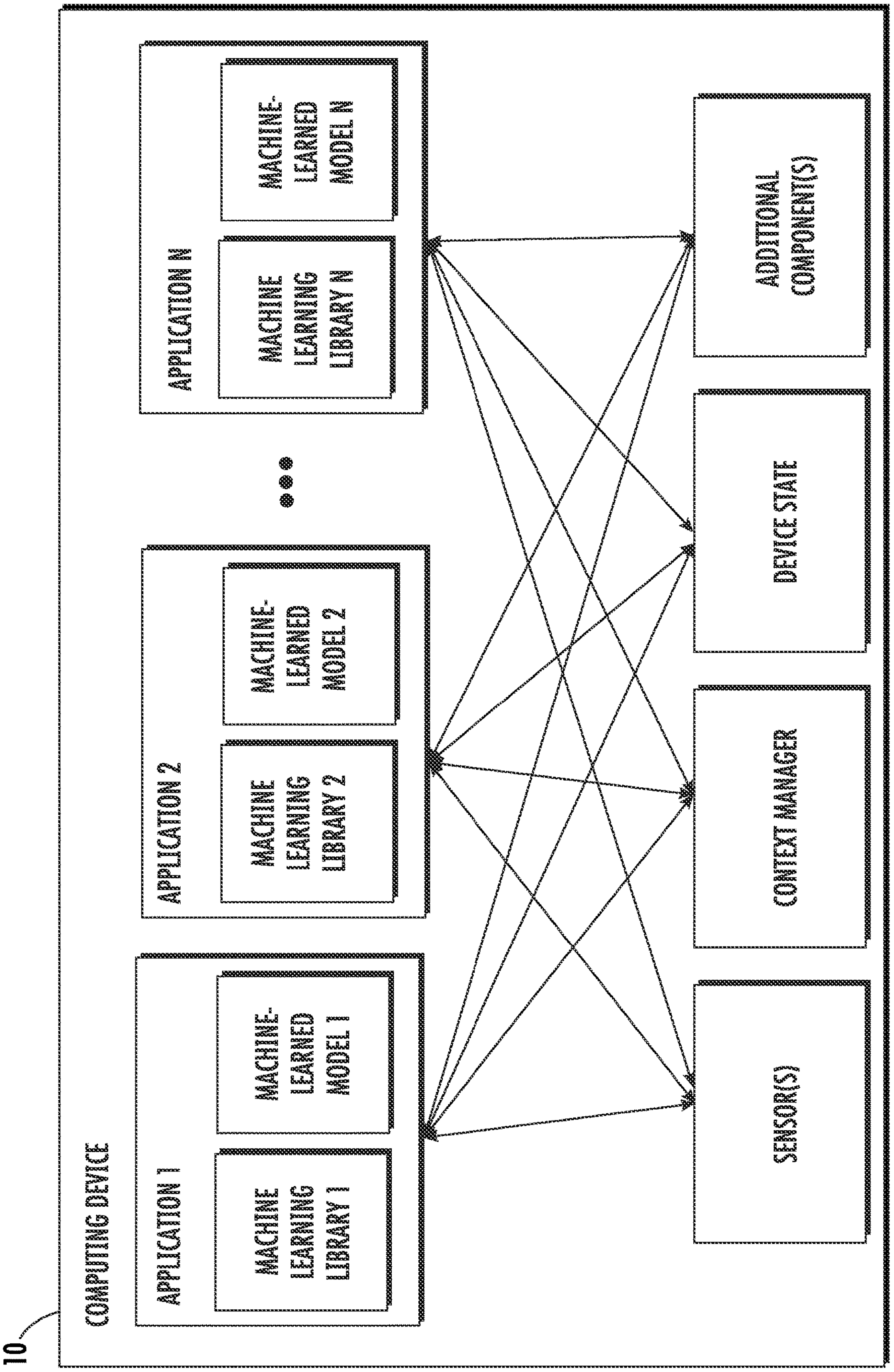
FIG. 1B depicts a block diagram of an example computing device that performs prompt ensembling for classification with text-image models according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
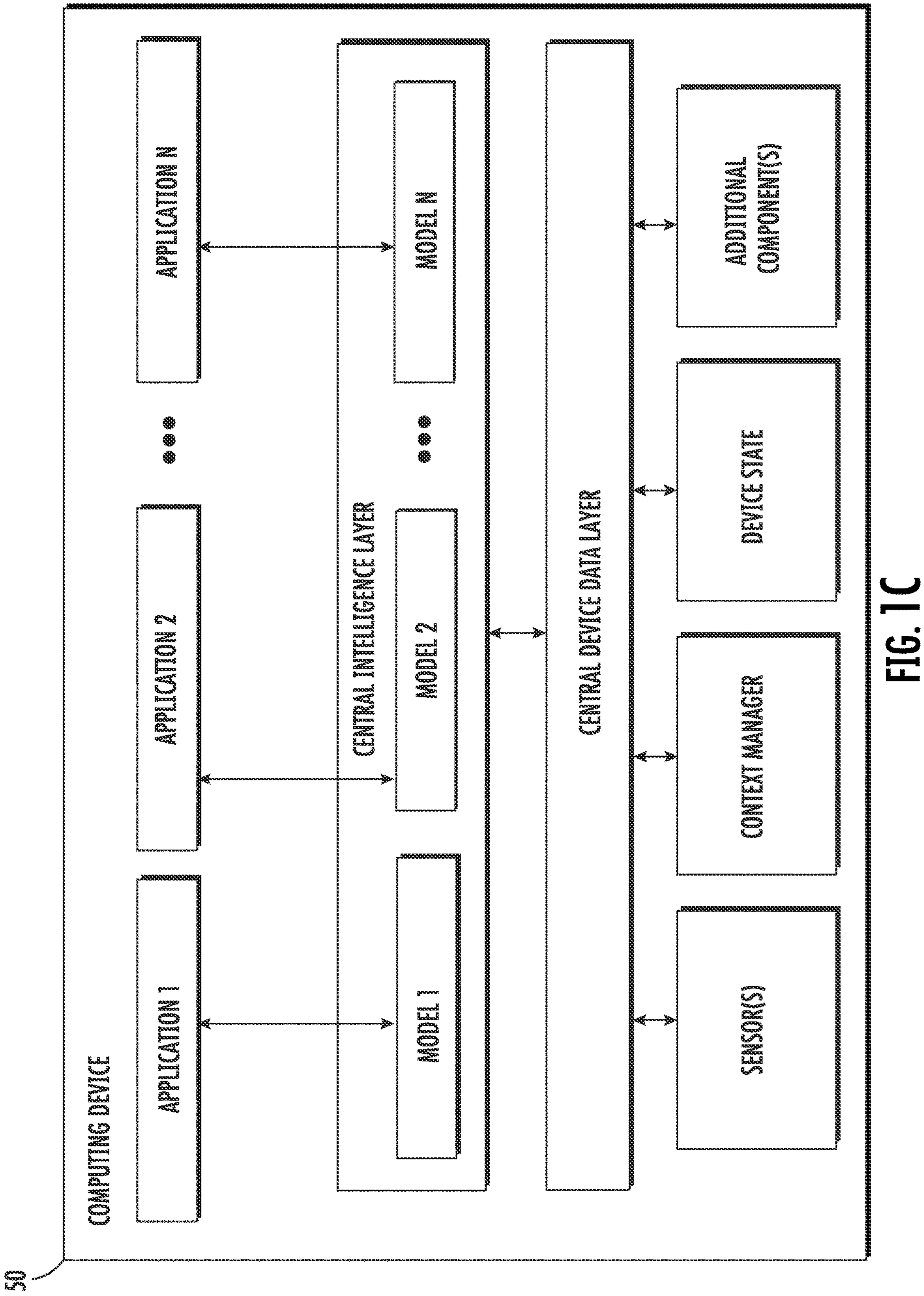
FIG. 1C depicts a block diagram of an example computing device that performs prompt ensembling for classification with text-image models according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

In some implementations, the one or more machine-learned models can include one or more generative models. The one or more generative models can include language models (e.g., large language models and/or vision language models), image generation models (e.g., text-to-image generation models and/or image augmentation models), audio generation models, video generation models, graph generation models, and/or other data generation models (e.g., other content generation models). The one or more generative models 90 can include one or more transformer models, one or more convolutional neural networks, one or more recurrent neural networks, one or more feedforward neural networks, one or more generative adversarial networks, one or more self-attention models, one or more embedding models, one or more encoders, one or more decoders, and/or one or more other models. In some implementations, the one or more generative models can include one or more autoregressive models (e.g., a machine-learned model trained to generate predictive values based on previous behavior data) and/or one or more diffusion models (e.g., a machine-learned model trained to generate predicted data based on generating and processing distribution data associated with the input data).

The one or more generative models can be trained to process input data and generate model-generated content items, which may include a plurality of predicted words, pixels, signals, and/or other data. The model-generated content items may include novel content items that are not the same as any pre-existing work. The one or more generative models 90 can leverage learned representations, sequences, and/or probability distributions to generate the content items, which may include phrases, storylines, settings, objects, characters, beats, lyrics, and/or other aspects that are not included in pre-existing content items.

The one or more generative models may include a vision language model. The vision language model can be trained, tuned, and/or configured to process image data and/or text data to generate a natural language output. The vision language model may leverage a pre-trained large language model (e.g., a large autoregressive language model) with one or more encoders (e.g., one or more image encoders and/or one or more text encoders) to provide detailed natural language outputs that emulate natural language composed by a human.

The vision language model may be utilized for zero-shot image classification, few shot image classification, image captioning, multimodal query distillation, multimodal question and answering, and/or may be tuned and/or trained for a plurality of different tasks. The vision language model can perform visual question answering, image caption generation, feature detection (e.g., content monitoring (e.g. for inappropriate content)), object detection, scene recognition, and/or other tasks.

The vision language model may leverage a pre-trained language model that may then be tuned for multimodality. Training and/or tuning of the vision language model can include image-text matching, masked-language modeling, multimodal fusing with cross attention, contrastive learning, prefix language model training, and/or other training techniques. For example, the vision language model may be trained to process an image to generate predicted text that is similar to ground truth text data (e.g., a ground truth caption for the image). In some implementations, the vision language model may be trained to replace masked tokens of a natural language template with textual tokens descriptive of features depicted in an input image. Alternatively and/or additionally, the training, tuning, and/or model inference may include multi-layer concatenation of visual and textual embedding features. In some implementations, the vision language model may be trained and/or tuned via jointly learning image embedding and text embedding generation, which may include training and/or tuning a system to map embeddings to a joint feature embedding space that maps text features and image features into a shared embedding space. The joint training may include image-text pair parallel embedding and/or may include triplet training. In some implementations, the images may be utilized and/or processed as prefixes to the language model.

Example Model Arrangements

Figure 2:
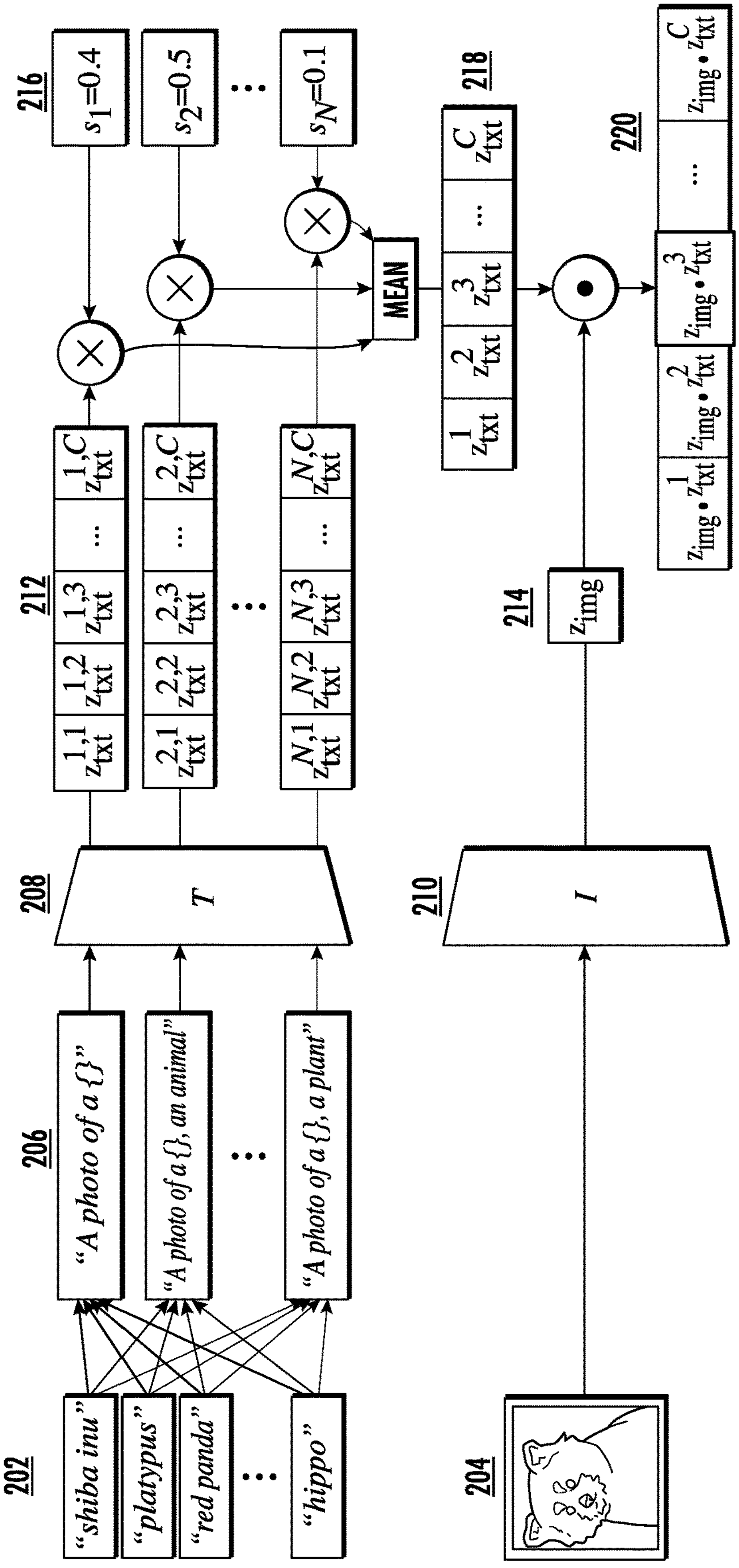
FIG. 2 depicts a block diagram of an example classification with a text embedding model and an image embedding model according to example embodiments of the present disclosure.

FIG. 2 depicts a block diagram of an example classification with a text embedding model and an image embedding model according to example embodiments of the present disclosure. For example, FIG. 2 can depict the construction of a zero-shot classifier with zero-shot prompt ensembling (ZPE) for text-image models. Logits can be calculated by combining text and image representations. The final text representation can be a weighted ensemble of representations corresponding to different prompts. In some implementations, the scores for weighting each prompt can be calculated without access to any labeled training data.

In particular, a plurality of candidate text labels 202 and an image 204 can be obtained. The image 204 can be obtained from a user computing system. The image 204 can depict an object (e.g., a red panda) within a scene. The plurality of candidate text labels 202 can include a plurality of potential object classifications. The plurality of candidate text labels 202 may be obtained to determine a classification for the object depicted in the image 204.

The plurality of candidate text labels 202 may be leveraged to fill a plurality of prompts 206 to generate a plurality of candidate text strings. The plurality of prompts 206 can include a plurality of caption templates and/or a plurality of response templates. The prompts can be ensembled such that the plurality of candidate text strings can include combinations for each of the plurality of prompts 206 with the plurality of candidate text labels 202. The plurality of candidate text strings can be associated with candidate captions and/or candidate responses.

The plurality of candidate text strings can be processed with a text embedding model 208 to generate a plurality of text embeddings sets 212. Each text embedding set may be associated with a different prompt of the plurality of prompts 206 and may include text strings that include the respective prompt with each of the plurality of candidate text labels 202. The plurality of text embedding sets can be descriptive of features of the plurality of text strings.

The image 204 can be processed with an image embedding model 210 to generate an image embedding 214. The image embedding 214 can be descriptive of features associated with the image 204. The image embedding model 210 may have been jointly pre-trained with the text embedding model 208. The image embedding model 210 and the text embedding model 208 may have been trained on a plurality of image-caption pairs.

The plurality of text embedding sets 212 and the image embedding 214 can be processed to determine a plurality of prompt scores 216 associated with the plurality of prompts 206. In particular, each prompt of the plurality of prompts 206 may be evaluated based on the respective text embedding set for the particular prompt. The plurality of prompt scores 216 can be associated with an embedding similarity measure between the image embedding 214 and the plurality of text embedding sets 212.

The plurality of text embedding sets 212 and the plurality of prompt scores 216 can then be processed to generate a plurality of weighted text embeddings 218 associated with the plurality of prompts 206. The plurality of weighted text embeddings 218 and the image embedding 214 can then be processed to determine a plurality of logits 220. The plurality of logits 220 can then be leveraged to determine an image classification from the plurality of text strings. The image classification may then be provided as output (e.g., provided for display and/or transmitted to a user computing system).

Figure 3:
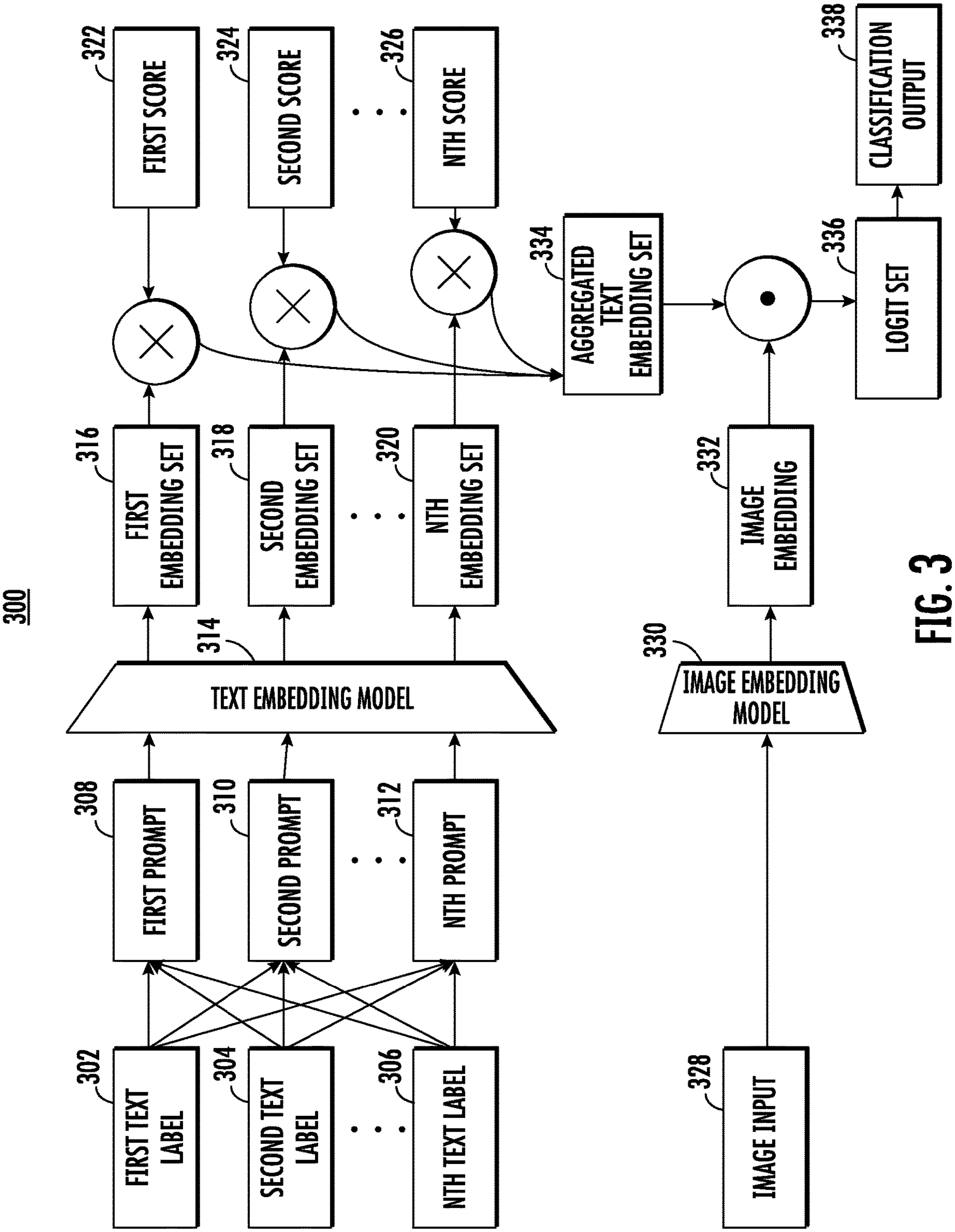
FIG. 3 depicts a block diagram of an example logit generation for label prediction according to example embodiments of the present disclosure.

FIG. 3 depicts a block diagram of an example logit generation for label prediction according to example embodiments of the present disclosure. In particular, FIG. 3 can depict obtaining an image input 328, which can be processed with an image embedding model 330 to generate an image embedding 332. Additionally and/or alternatively, a plurality of candidate text labels (e.g., a first text label 302, a second text label 304, . . . , an nth text label 306, etc.) descriptive of candidate classifications can be obtained. A plurality of example prompt templates (e.g., a first prompt 308, a second prompt 310, . . . , an nth prompt, etc.) can be obtained and/or generated. Each of the plurality of candidate text labels (e.g., the first text label 302, the second text label 304, . . . , the nth text label 306, etc.) can be plugged into each of the plurality of prompt templates (e.g., the first prompt 308, the second prompt 310, . . . , the nth prompt, etc.) to generate a plurality of text strings. Each of the plurality of text strings can be processed to generate a plurality of respective text embeddings (e.g., a first embedding set 316 associated with the first prompt 308, a second embedding set 318 associated with the second prompt 310, . . . , an nth embedding set 320 associated with the nth prompt 312, etc.). Sets of text embeddings associated with a prompt can be utilized to determine a prompt score for the prompt. For example, the set of text embeddings can be compared to the image embedding 332 to measure an embedding similarity to determine a score for the prompt.

In particular, a plurality of candidate text labels (e.g., a first text label 302, a second text label 304, . . . , an nth text label 306, etc.) and an image input 328 can be obtained. The image input 328 can be obtained from a user computing system. The image input 328 can depict an object (e.g., an individual named John Smith from Gainesville, New Mexico) within a scene. The plurality of candidate text labels 202 can include a plurality of potential object classifications. The plurality of candidate text labels (e.g., the first text label 302, the second text label 304, . . . , the nth text label 306, etc.) may be obtained to determine a classification for the object depicted in the image input 328.

The plurality of candidate text labels (e.g., the first text label 302, the second text label 304, . . . , the nth text label 306, etc.) may be leveraged to fill a plurality of prompt templates (e.g., the first prompt 308, the second prompt 310, . . . , the nth prompt, etc.) to generate a plurality of candidate text strings. The plurality of prompt templates (e.g., the first prompt 308, the second prompt 310, . . . , the nth prompt, etc.) can include a plurality of caption templates and/or a plurality of response templates. The prompts can be ensembled such that the plurality of candidate text strings can include combinations for each of the plurality of prompts (e.g., the first prompt 308, the second prompt 310, . . . , the nth prompt, etc.) with the plurality of candidate text labels (e.g., the first text label 302, the second text label 304, . . . , the nth text label 306, etc.). The plurality of candidate text strings can be associated with candidate captions and/or candidate responses.

The plurality of candidate text strings can be processed with a text embedding model 314 to generate a plurality of respective text embeddings (e.g., a first embedding set 316 associated with the first prompt 308, a second embedding set 318 associated with the second prompt 310, . . . , an nth embedding set 320 associated with the nth prompt 312, etc.). Each text embedding set may be associated with a different prompt of the plurality of prompts (e.g., the first prompt 308, the second prompt 310, . . . , the nth prompt, etc.) and may include text strings that include the respective prompt with each of the plurality of candidate text labels (e.g., the first text label 302, the second text label 304, . . . , the nth text label 306, etc.). The plurality of text embedding sets can be descriptive of features of the plurality of text strings.

The image input 328 can be processed with an image embedding model 330 to generate an image embedding 332. The image embedding 332 can be descriptive of features associated with the image input 328. The image embedding model 330 may have been jointly pre-trained with the text embedding model 314. The image embedding model 330 and the text embedding model 314 may have been trained on a plurality of image-caption pairs.

The plurality of respective text embeddings (e.g., the first embedding set 316 associated with the first prompt 308, the second embedding set 318 associated with the second prompt 310, . . . , the nth embedding set 320 associated with the nth prompt 312, etc.) and the image embedding 332 can be processed to determine a plurality of prompt scores (e.g., a first score 322 associated with the first prompt 308, a second score 324 associated with the second prompt 310, . . . , an nth score 326 associated with the nth prompt 312, etc.) associated with the plurality of prompts (e.g., the first prompt 308, the second prompt 310, . . . , the nth prompt, etc.). In particular, each prompt of the plurality of prompts (e.g., the first prompt 308, the second prompt 310, . . . , the nth prompt, etc.) may be evaluated based on the respective text embedding set for the particular prompt. The plurality of prompt scores (e.g., the first score 322 associated with the first prompt 308, the second score 324 associated with the second prompt 310, . . . , the nth score 326 associated with the nth prompt 312, etc.) can be associated with an embedding similarity measure between the image embedding 332 and the plurality of respective text embeddings (e.g., the first embedding set 316 associated with the first prompt 308, the second embedding set 318 associated with the second prompt 310, . . . , the nth embedding set 320 associated with the nth prompt 312, etc.).

The plurality of respective text embeddings (e.g., the first embedding set 316 associated with the first prompt 308, the second embedding set 318 associated with the second prompt 310, . . . , the nth embedding set 320 associated with the nth prompt 312, etc.) and the plurality of prompt scores (e.g., the first score 322 associated with the first prompt 308, the second score 324 associated with the second prompt 310, . . . , the nth score 326 associated with the nth prompt 312, etc.) can then be processed to generate an aggregated text embedding set 334 associated with the plurality of prompts (e.g., the first prompt 308, the second prompt 310, . . . , the nth prompt, etc.). The aggregated text embedding set 334 and the image embedding 332 can then be processed to determine a plurality of logits 336. The plurality of logits 336 can then be leveraged to determine a classification output 338 associated with the plurality of text strings. The classification output 338 may then be provided as output (e.g., provided for display and/or transmitted to a user computing system).

The prompt score can then be utilized to weight the text embeddings. The weighted embeddings can be concatenated (and/or averaged and/or aggregated) based on an association with a particular candidate text label. The concatenated (and/or averaged and/or aggregated) text embeddings can be utilized to determine a classification label for the image based on a highest probability candidate text label (e.g., based on a logit set determined based on embedding similarity).

Figure 4:
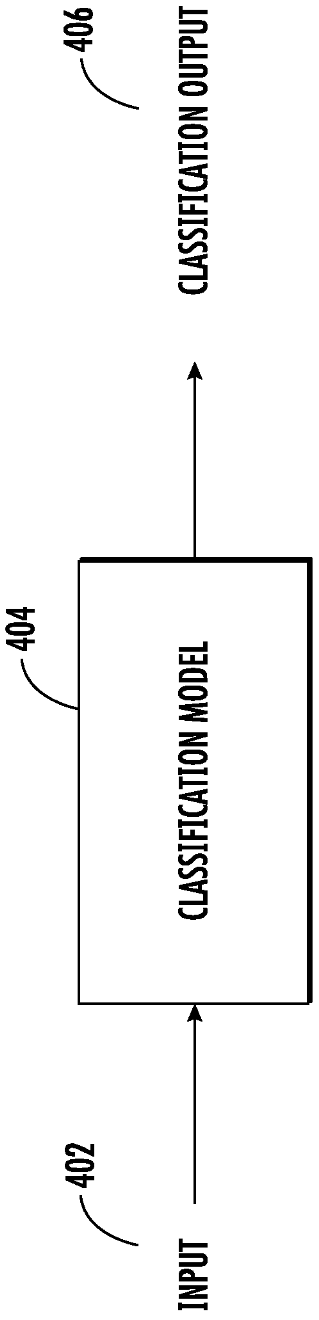
FIG. 4 depicts a block diagram of an example classification model according to example embodiments of the present disclosure.

FIG. 4 depicts a block diagram of an example classification model 404 according to example embodiments of the present disclosure. For example, a classification model 404 can process an input 402 (e.g., an image) to generate a classification output 406 (e.g., a text label). In particular, the systems and methods disclosed herein can be utilized to leverage a pre-trained foundation model as a classification model 404. The systems and methods may obtain an input 402, which may include an image. The input 402 may be processed with the classification model 404 (e.g., a pre-trained generative model that is conditioned on a plurality of generated text strings) to generate a classification output 406. The classification output 406 may be descriptive of a natural language caption and/or response.

Figure 5:
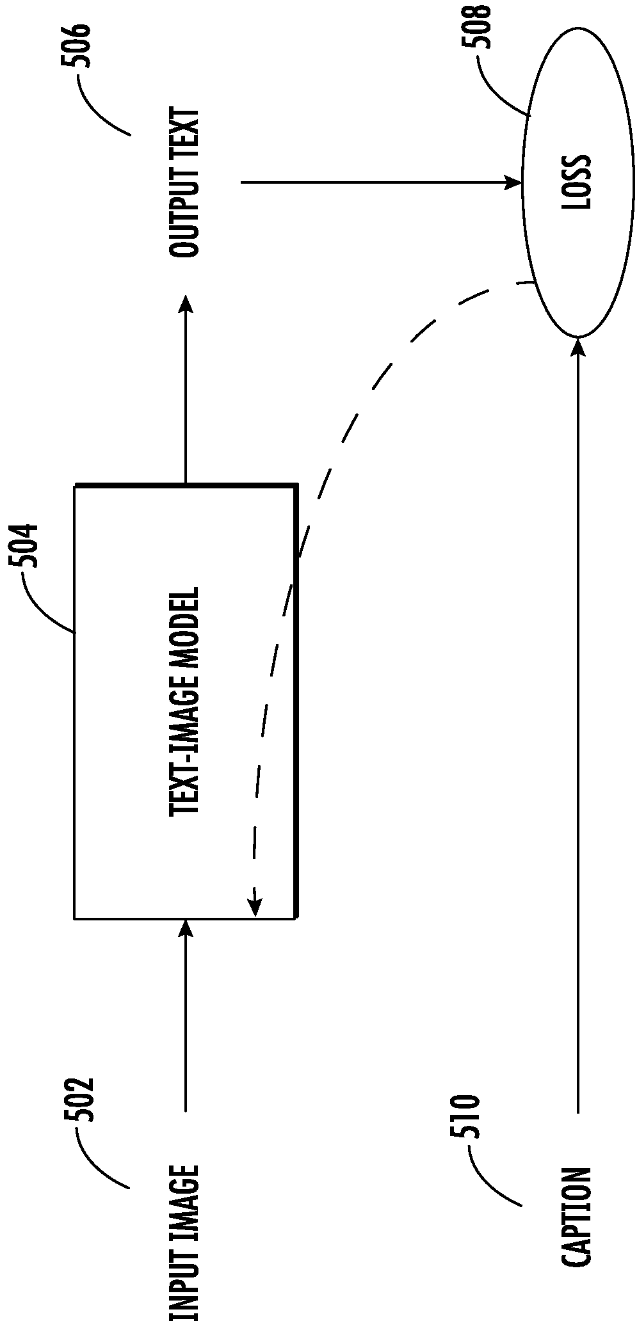
FIG. 5 depicts a block diagram of an example text-image model training according to example embodiments of the present disclosure.

FIG. 5 depicts a block diagram of an example text-image model training according to example embodiments of the present disclosure. For example, the pre-trained text-image model 504 may be trained on a large training dataset that includes a plurality of image-caption training examples, which may include a plurality of image-caption pairs (e.g., each image-caption pair can include an input image 502 and a respective caption 510). In particular, an input image 502 may be processed by the text-image model 504 to generate output text 506. The output text 506 and a caption 510 associated with the input image 502 may be utilized to evaluate a loss function 508. One or more parameters of the text-image model 504 can be adjusted based on the loss function 508 evaluation (e.g., a generated gradient descent).

Example Methods

Figure 6:
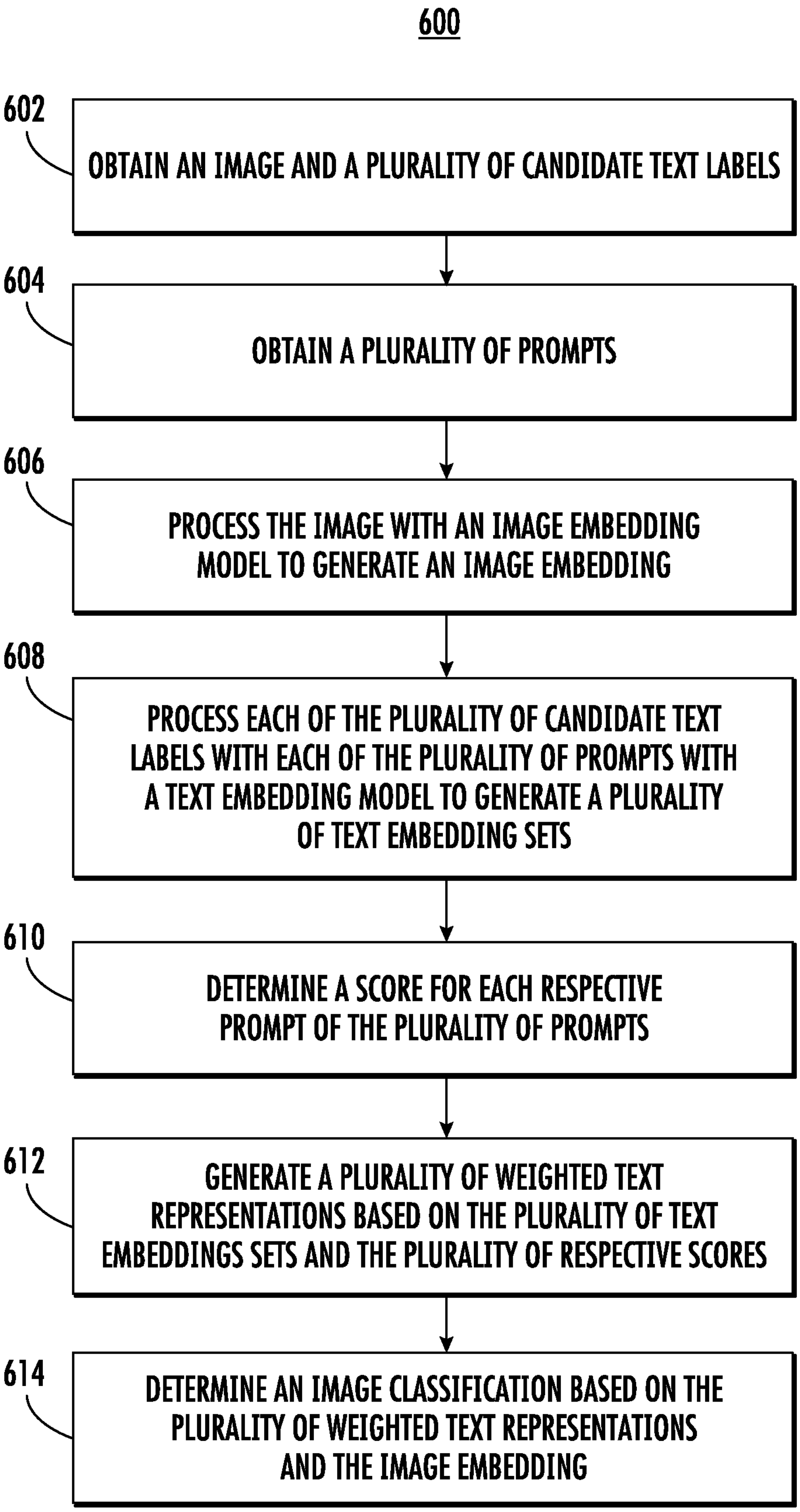
FIG. 6 depicts a flow chart diagram of an example method to perform classification prediction using prompt ensembling according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain an image and a plurality of candidate text labels. The plurality of candidate text labels can be associated with a particular task. The plurality of candidate text labels can be descriptive of a plurality of candidate object classifications. The image can include one or more objects in a scene. The plurality of candidate text labels can be associated with a plurality of candidate object classifications.

At 604, the computing system can obtain a plurality of prompts. The plurality of prompts can be associated with a phrase to provide with a classification output. In some implementations, the plurality of prompts can include a plurality of caption templates. The plurality of caption templates can be configured to be augmented to include a classification label and be descriptive of an example caption for an input image. The plurality of prompts may be obtained from a database and/or may be generated with a machine-learned model.

At 606, the computing system can process the image with an image embedding model to generate an image embedding. The image embedding model can be pre-trained. The image embedding can include one or more vector values associated with features in the image.

At 608, the computing system can process each of the plurality of candidate text labels with each of the plurality of prompts with a text embedding model to generate a plurality of text embedding sets. Each text embedding set can be associated with a different prompt of the plurality of prompts. In some implementations, each text embedding set can include a particular text embedding associated with a particular candidate text label of the plurality of candidate text labels. The text embedding model can be pre-trained. The plurality of text embedding sets can include a plurality of vector values associated with features in the text strings.

At 610, the computing system can determine a score for each respective prompt of the plurality of prompts. In some implementations, determining the score for each respective prompt of the plurality of prompts can include determining a similarity measure between a text embedding set of a respective prompt and the image embedding. The similarity measure can include an average embedding similarity between the text embeddings of the text embedding set and the image embedding. The similarity measure can be based on the generated vector values. In some implementations, the similarity measures can be based on embedding distances.

Alternatively and/or additionally, determining the score for each respective prompt of the plurality of prompts can include obtaining a control image. The control image can differ from the image. Determining the score for each respective prompt of the plurality of prompts can include processing the control image with the image embedding model to generate a control image embedding. In some implementations, the score can be generated based on the image embedding, the control image embedding, and a respective text embedding set for the respective prompt.

At 612, the computing system can generate a plurality of weighted text representations based on the plurality of text embeddings sets and the plurality of respective scores. Each weighted text representation can be associated with a respective prompt of the plurality of prompts and a respective candidate text label of the plurality of candidate text labels. The weighted text representations can be determined based on average scores for text strings associated with a respective prompt.

At 614, the computing system can determine an image classification based on the plurality of weighted text representations and the image embedding. The image classification can include a selected candidate text label of the plurality of candidate text labels. The image classification can include a particular text label of the plurality of candidate text labels within a particular prompt of the plurality of prompts.

In some implementations, the computing system can obtain a pre-trained image-text model. The pre-trained image-text model can include a foundation model pre-trained on a training dataset without a specific downstream task. The pre-trained image-text model can include the text embedding model and the image embedding model. The training dataset can include a plurality of image-caption training examples.

Additionally and/or alternatively, the computing system can provide the image classification as an output. The image classification can be provided for display and/or transmitted to a user computing system.

Figure 7:
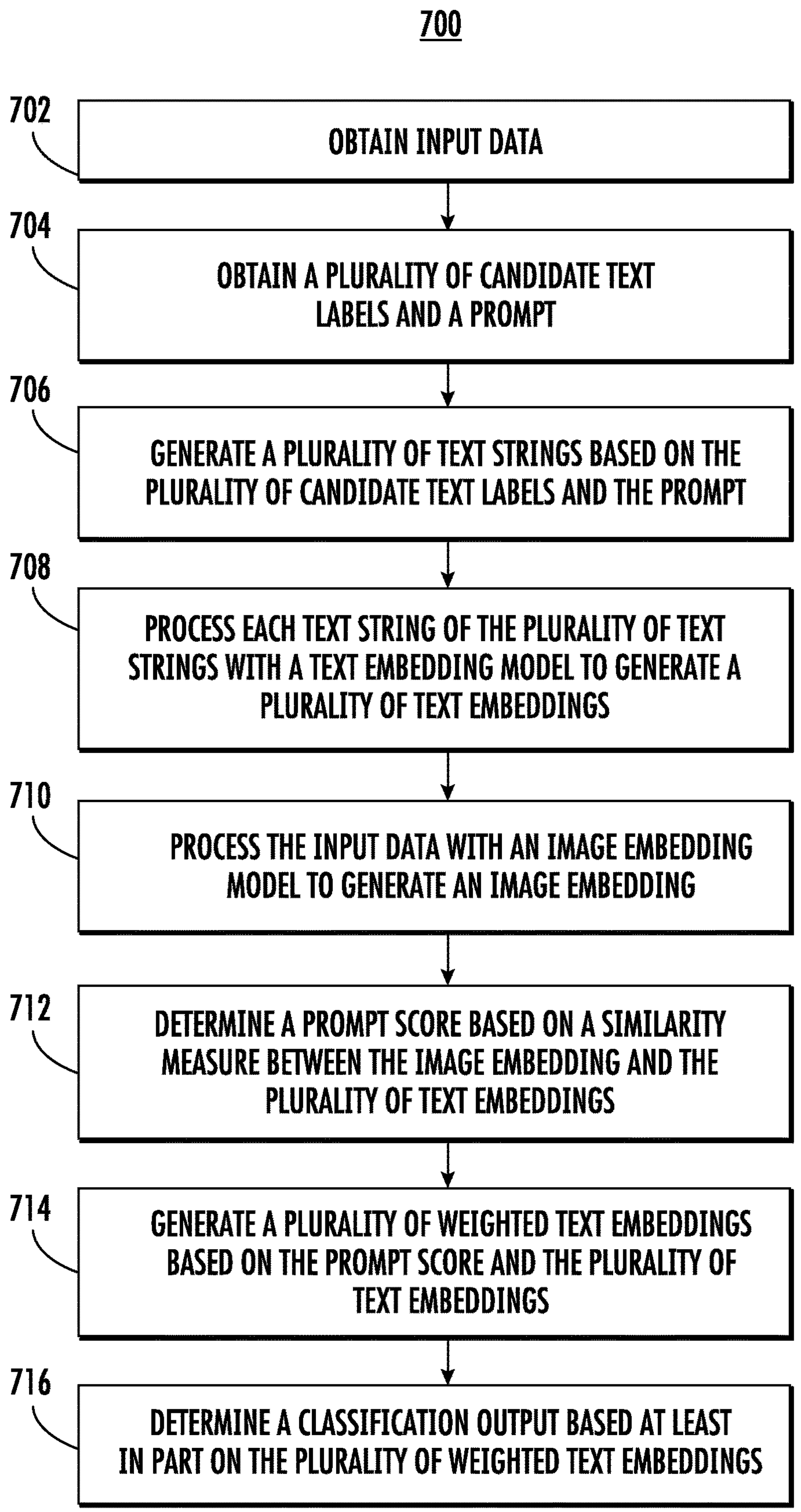
FIG. 7 depicts a flow chart diagram of an example method to perform prompt scoring and weighting according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain input data. The input data can be descriptive of one or more images. The input data may include text data, image data, audio data, structure data, layout data, latent encoding data, signal data, multimodal data, and/or other data. The input data may be uploaded, selected, downloaded, and/or obtained from a live stream of signal data.

At 704, the computing system can obtain a plurality of candidate text labels and a prompt. The plurality of candidate text labels can be descriptive of a plurality of candidate classifications. The plurality of candidate text labels and a prompt may be obtained based on a particular context, an initial classification, and/or other determinations.

At 706, the computing system can generate a plurality of text strings based on the plurality of candidate text labels and the prompt. Each of the plurality of text strings can be generated by augmenting the prompt with a candidate text label of the plurality of candidate text labels. The plurality of text strings may be generated based on prompt ensembling.

At 708, the computing system can process each text string of the plurality of text strings with a text embedding model to generate a plurality of text embeddings. Each text embedding of the plurality of text embeddings can be associated with a respective text string. The text embedding model can include a text encoder. The text embedding model may be part of a vision language model.

At 710, the computing system can process the input data with an image embedding model to generate an image embedding. The image embedding model can include an image encoder. In some implementations, the text embedding model and the image embedding model may have been pre-trained on a training dataset. The training dataset can include a plurality of text-image pairs. Each text-image pair can include an image and a respective caption. Additionally and/or alternatively, the text embedding model and the image embedding model may have been trained based on a bi-directional contrastive loss. The image embedding model may be part of a vision language model.

At 712, the computing system can determine a prompt score based on a similarity measure between the image embedding and the plurality of text embeddings. The prompt score may be based on a max logit determination. The max logits determination may be based on the image embedding and the text embeddings.

At 714, the computing system can generate a plurality of weighted text embeddings based on the prompt score and the plurality of text embeddings. The plurality of weighted text embeddings may be based on score averages and/or may be based on comparing scores associated with different prompts.

At 716, the computing system can determine a classification output based at least in part on the plurality of weighted text embeddings. In some implementations, determining the classification output can include determining a similarity measure associated with each weighted text embedding of the plurality of weighted text embeddings based on the image embedding and the plurality of weighted text embeddings.

In some implementations, the computing system can obtain a second prompt. The second prompt can differ from the prompt. The computing system can generate a plurality of second weighted text embeddings based on the second prompt and the plurality of text embeddings. Additionally and/or alternatively, the computing system can determine an adjusted text embedding for a particular candidate text label of the plurality of candidate text labels based on a respective weighted text embedding of the plurality of weighted text embeddings and a respective second weighted text embedding of the plurality of second weighted text embeddings.

The classification output may be determined based on a similarity measure associated with the adjusted text embedding and the image embedding.

Figure 8:
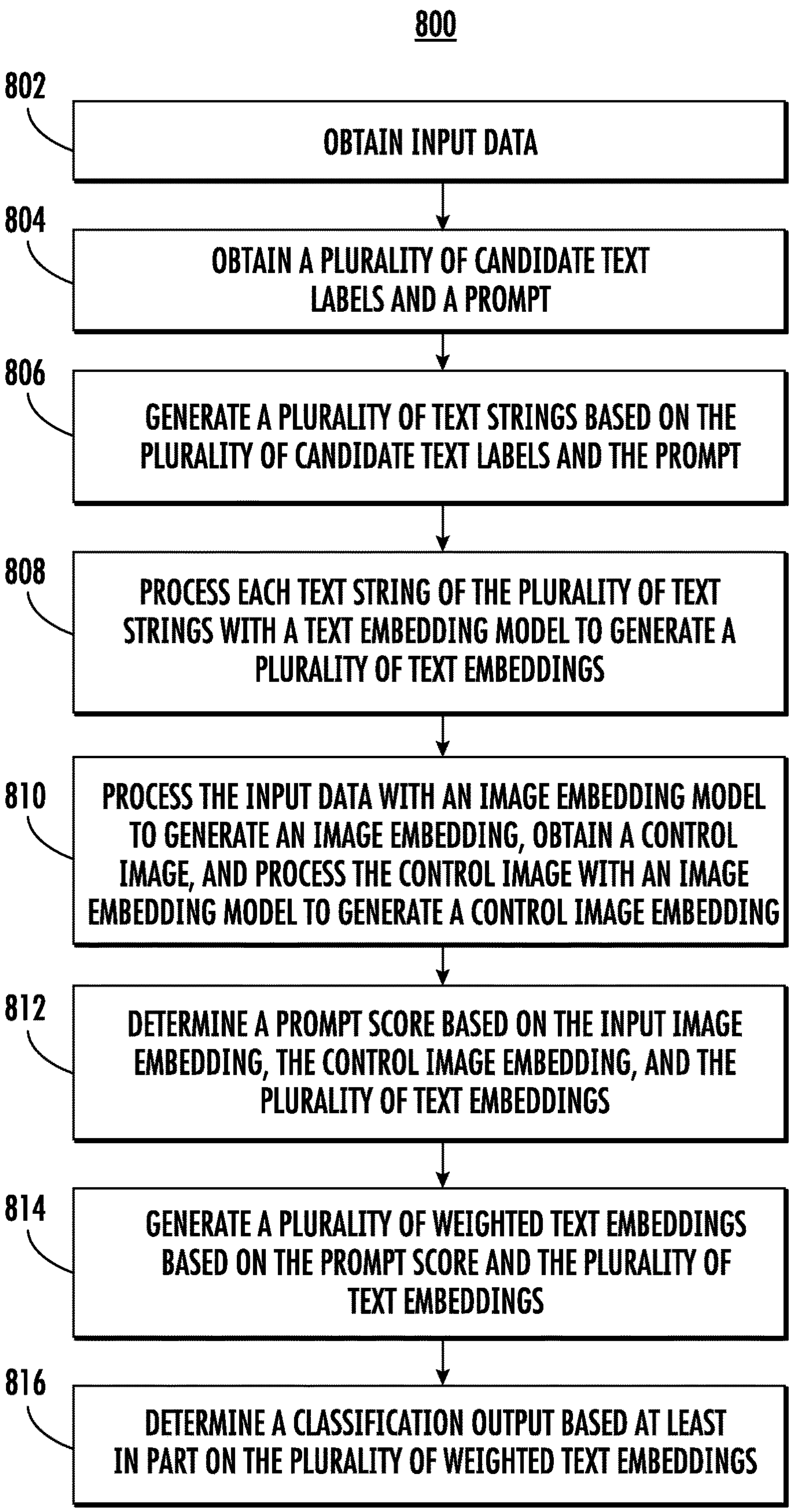
FIG. 8 depicts a flow chart diagram of an example method to perform control image embedding-based scoring according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain input data. The input data can be descriptive of one or more images. The input data may include an input image with text data and/or audio data associated with a query regarding the input image.

At 804, the computing system can obtain a plurality of candidate text labels and a prompt. The plurality of candidate text labels may be descriptive of a plurality of candidate classifications. The plurality of candidate text labels and the prompt can be obtained and/or generated based on the input image and/or the query.

At 806, the computing system can generate a plurality of text strings based on the plurality of candidate text labels and the prompt. Each of the plurality of text strings can be generated by augmenting the prompt with a candidate text label of the plurality of candidate text labels. The plurality of text strings may be based on prompt ensembling and/or may be based on token replacement.

At 808, the computing system can process each text string of the plurality of text strings with a text embedding model to generate a plurality of text embeddings. Each text embedding of the plurality of text embeddings can be associated with a respective text string. The text embedding model may be jointly trained with an image embedding model.

At 810, the computing system can process the input data with an image embedding model to generate an input image embedding, obtain a control image, and process the control image with an image embedding model to generate a control image embedding. The control image can differ from the one or more images of the input data. The image embedding model can generate the input image embedding and the control image embedding to determine a response to the input data and mitigate biases of the system.

At 812, the computing system can determine a prompt score based on the input image embedding, the control image embedding, and the plurality of text embeddings. In some implementations, determining the prompt score can include determining a first similarity measure based on the input image embedding and the plurality of text embeddings, determining a second similarity measure based on the control image embedding and the plurality of text embeddings, and determining the prompt score based on a difference between the first similarity measure and the second similarity measure.

At 814, the computing system can generate a plurality of weighted text embeddings based on the prompt score and the plurality of text embeddings. In some implementations, the plurality of weighted text embeddings can be generated based on softmax weighting across a plurality of prompt text embedding sets.

At 816, the computing system can determine a classification output based at least in part on the plurality of weighted text embeddings. The classification output may be based on the prompt weighting and respective text string scoring.

In some implementations, the computing system can generate a plurality of probability predictions for the plurality of candidate text labels based on the plurality of weighted text embeddings and the image embedding. The classification output may be determined based on the plurality of probability predictions.

Figure 9:
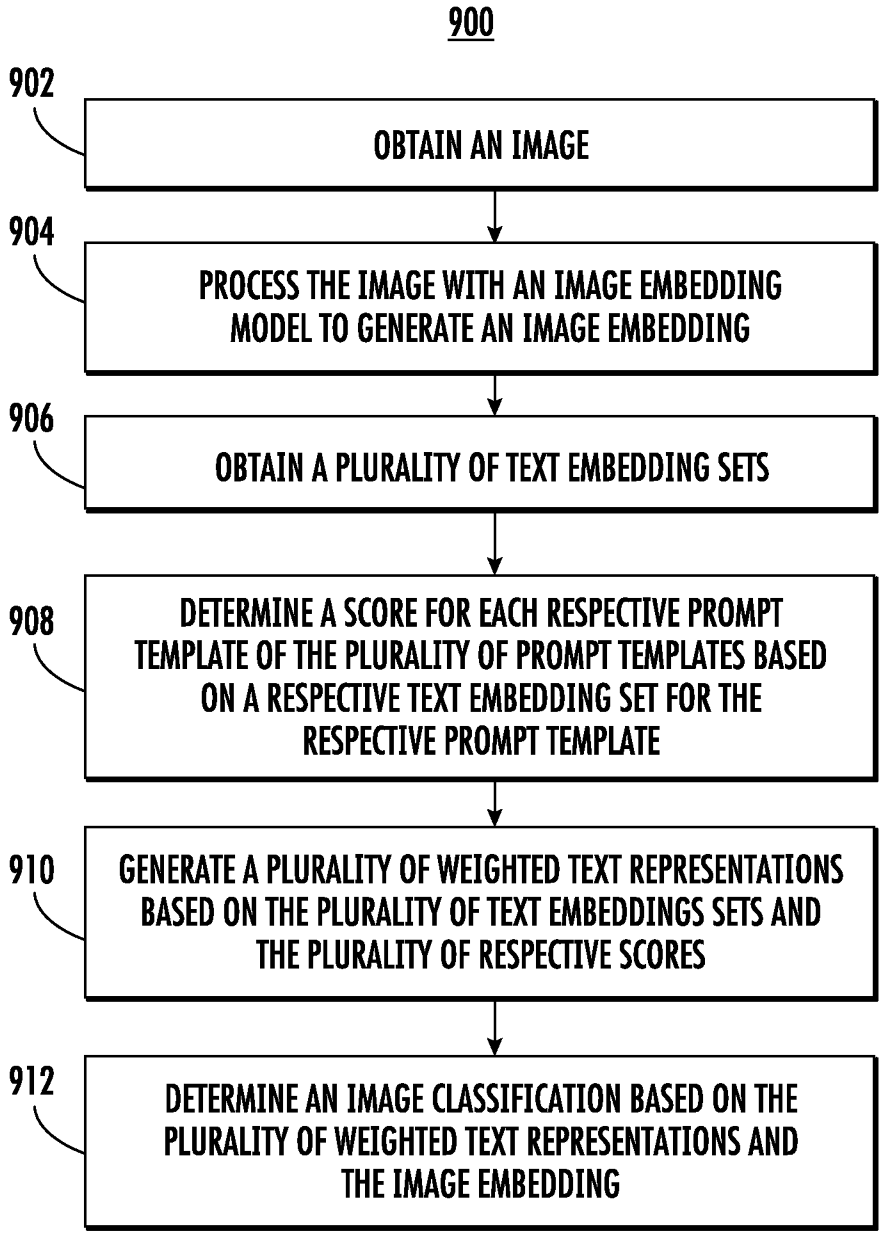
FIG. 9 depicts a flow chart diagram of an example method to perform image classification determination according to example embodiments of the present disclosure.

FIG. 9 depicts a flow chart diagram of an example method to perform according to example embodiments of the present disclosure. Although FIG. 9 depicts steps performed in a particular order for purposes of illustration and discussion, the methods of the present disclosure are not limited to the particularly illustrated order or arrangement. The various steps of the method 900 can be omitted, rearranged, combined, and/or adapted in various ways without deviating from the scope of the present disclosure.

At 902, a computing system can obtain an image. The image may depict one or more objects within an environment. The image may depict an action being performed.

At 904, the computing system can process the image with an image embedding model to generate an image embedding. The image embedding can be descriptive of object features and/or action features.

At 906, the computing system can obtain a plurality of text embedding sets. The plurality of text embedding sets may have been generated based on processing a plurality of candidate text labels with a plurality of prompt templates with a text embedding model. In some implementations, each text embedding set can be associated with a different prompt template of the plurality of prompt templates. The plurality of text embedding sets may be grouped based on the respective prompts.

At 908, the computing system can determine a score for each respective prompt template of the plurality of prompt templates based on a respective text embedding set for the respective prompt template. The score for each respective prompt template of the plurality of prompt templates can be based on average scores, aggregate scores, and/or highest scores from a set.

At 910, the computing system can generate a plurality of weighted text representations based on the plurality of text embeddings sets and the plurality of respective scores. Each weighted text representation can be associated with a respective prompt of the plurality of prompts and a respective candidate text label of the plurality of candidate text labels.

At 912, the computing system can determine an image classification based on the plurality of weighted text representations and the image embedding. In some implementations, the image classification can include a selected candidate text label of the plurality of candidate text labels.

Example Implementations and Experiments

Contrastively trained text-image models can have the ability to perform zero-shot classification (e.g., classifying previously unseen images into categories that the model has never been explicitly trained to identify). However, the zero-shot classifiers may rely on prompt engineering to achieve high accuracy. Prompt engineering can rely on hand-crafting a set of prompts for individual downstream tasks. The systems and methods disclosed herein can be leveraged to automate the prompt engineering and can improve zero-shot accuracy through prompt ensembling. The systems and methods can be given and/or generate a large pool of prompts, can automatically score the prompts and ensemble those that are most suitable for a particular downstream dataset, without needing access to labeled validation data. Several pathologies in a naive prompt scoring method can be identified as overconfident due to biases in pre-training and test data, and the systems and methods may utilize and/or generate a novel prompt scoring method that corrects for the biases. Using the scoring method to create a weighted average prompt ensemble, the systems and methods can outperform an equal average ensemble, as well as hand-crafted prompts, on a variety of different benchmarks, while being fully automatic, optimization-free, and not requiring access to labeled validation data.

Contrastively trained text-image models (e.g., CLIP (Radford et al., "Learning transferable visual models from natural language supervision," 139:8748-8763, 2021.), ALIGN (Jia et al., "Scaling up visual and vision-language representation learning with noisy text supervision," 139:4904-4916, 2021.), LiT (Zhai et al., "Lit: Zero-shot transfer with locked-image text tuning," pp. 18102-18112, 2022.), and BASIC (Pham et al., "Combined scaling for zero-shot transfer learning," CoRR, abs/2111.10050, 2021.) can have the ability to perform zero-shot classification. For example, the models can be used to classify previously unseen images into categories for which the model has never been explicitly trained to identify. Such zero-shot classifiers can match the performance of standard classification models which have access to training examples. However, achieving strong zero-shot classification performance can rely on prompt engineering. For example, Zero-shot CLIP ViT-B/16 performance on ImageNet increases from 64.18% to 66.92% and 68.57% when using the prompt 'A photo of { }.', and a selection of 80 hand-crafted prompts, rather than class name only. To use a set of hand-crafted prompts for zero-shot classification, the text embeddings of the prompts composed with class names can be averaged into a single vector to represent the class. Prompt engineering can be utilized to reduce the 'distribution shift' between the zero-shot setting and the training data in which the captions seldom consist of a single word.

Unfortunately, the reliance on a set of hand-crafted prompts to achieve good zero-shot performance can reduce the promised general applicability of previous zero-shot classifiers. Designing different sets of hand-crafted prompts can be labor-intensive, and the common prompt design processes can be reliant on access to a labeled validation dataset, which may not be available in practice. The systems and methods disclosed herein can automate prompt engineering for zero-shot classifiers. Specifically, a zero-shot model and a large pool of potential prompts can be utilized by the system to select the optimal subset of prompts that maximize the model performance in a zero-shot fashion, which may be without access to a labeled validation set.

The systems and methods can include an algorithm for automatically scoring the importance of prompts in a large pool given a specific downstream task when using text-image models for zero-shot classification. The systems and methods can include a weighted average prompt ensembling method using the scores as the weights. Several potential pathologies may be identified in a naive prompt scoring method where the score can be easily overconfident due to biases in both pre-training and test data. The systems and methods can address these pathologies via bias correction in a zero-shot and optimization-free fashion.

Contrastively trained text-image models can include a text encoder T and an image encoder I. The encoders can produce embeddings $z_{txt}$=T (text) and $z_{img}$=I(image), both of size D.

The models can be trained on batches of B text-image pairs $\{(\text{text}_b, \text{image}_b)\}_{b-1}^{B}$ (e.g., photographs and their captions) to encourage that $z_{txt}^{i}=z_{img}^{j}$, if i=j, and $z_{txt}^{i}\neq z_{img}^{j}$ otherwise. The training can include a bi-directional contrastive loss:

$$\text{logits}=\begin{bmatrix} z_{img}^{1}\cdot z_{txt}^{1} & z_{img}^{1}\cdot z_{txt}^{2} & \cdots & z_{img}^{1}\cdot z_{txt}^{B} \\ z_{img}^{2}\cdot z_{txt}^{1} & z_{img}^{2}\cdot z_{txt}^{2} & & z_{img}^{2}\cdot z_{txt}^{B} \\ \vdots & & \ddots & \vdots \\ z_{img}^{B}\cdot z_{txt}^{1} & z_{img}^{B}\cdot z_{txt}^{2} & \cdots & z_{img}^{B}\cdot z_{txt}^{B} \end{bmatrix}$$

$$\mathcal{L}_{img}=-\frac{1}{B}\sum_{b=1}^{B}\log\ \text{softmax}(\text{logits})_{b,b}$$

$$\mathcal{L}_{txt}=-\frac{1}{B}\sum_{b=1}^{B}\log\ \text{softmax}(\text{logits}^{T})_{b,b}$$

$$\mathcal{L}=(\mathcal{L}_{img}+\mathcal{L}_{txt})/2$$

which can be interpreted as the average cross-entropy loss when classifying which caption in the batch corresponds to a given image and vice-versa.

Once the text and image encoders have been trained, the system can utilize a zero-shot classifier with C classes for an image with representation $z_{img}$ by computing $$\text{logits}=\left[z_{img}\cdot z_{txt}^{1}\ \ldots\ z_{img}\cdot z_{txt}^{c}\ \ldots\ z_{img}\cdot z_{txt}^{C}\right]$$

$$\hat{c}=\text{argmax}_c\ \text{logits},$$

where ĉ is the predicted class, and $z^{c}$=T (class_name$_c$) with class name being a list of possible classes. Prompt ensembling can be generalized the above equation to $$\text{logits}=\begin{bmatrix} z_{img}\cdot z_{txt}^{1,1} & z_{img}\cdot z_{txt}^{1,2} & \cdots & z_{img}\cdot z_{txt}^{1,C} \\ z_{img}\cdot z_{txt}^{2,1} & z_{img}\cdot z_{txt}^{2,2} & & z_{img}\cdot z_{txt}^{2,C} \\ \vdots & & \ddots & \vdots \\ z_{img}\cdot z_{txt}^{P,1} & z_{img}\cdot z_{txt}^{P,2} & \cdots & z_{img}\cdot z_{txt}^{P,C} \end{bmatrix} \quad (1)$$

$$\hat{c}=\text{argmax}_c\frac{1}{P}\sum_{p=1}^{P}\text{logits}_p \quad (2)$$

when there are P prompt templates, where logits$_p$ is the $p^{th}$ row of logits, and $z_{txt}^{p,c}$=T (prompt_template$_p$∘class_name$_c$), with ∘ indicating the composition of a prompt template and a class name (e.g., 'A photo of a { }.'∘'dog'='A photo of a dog.'). Note that (2) can be seen as constructing an ensemble of classifiers in logit space, where each classifier uses a different prompt.

In some implementations, the systems and methods can include zero-shot weighted prompt ensembling. Zero-shot Prompt Ensembling (ZPE) for zero-shot classification with text-image models can include obtaining and/or utilizing a large pool of P prompts, which may or may not be entirely relevant to a specific problem at hand, and a previously unseen classification task. The systems and methods can learn a set of scores {s1, s2, . . . , sP} that can allow a system to perform a weighted average by replacing (2) with $$\hat{c}=\text{argmax}_c\frac{1}{P}\sum_{p=1}^{P}\text{logits}_p\times s_p \quad (3)$$

or a masked average by replacing (2) with $$\hat{c} = \text{argmax}_c \frac{1}{P}\sum_{p=1}^{P} \text{logits}_p \times s_p \times \mathbb{1}(s_p > \tau) \tag{4}$$

where $\mathbb{1}(\cdot)$ is the indicator function. The masked average can introduce a hyperparameter τ, the score threshold for prompt subset selection. In some implementations, the systems and methods can consider the hyperparameter-free weighted average. The weighted averaging of logits can be regarded as the weighted ensemble of many classifiers, where each of them is made of a different prompt, and the weights can be computed in a zero-shot fashion without any optimization or the access to test labels.

In some implementations, the systems and methods can include max logit scoring. The maximum logit over the classes max_logit=$\max_c$ logits can be a utilized confidence score for classification problems. Since $z_{img}$ and $z_{txt}$ are L2 normalized (e.g., $\|z_{img}\|=\|z_{txt}\|=1$), the inner product can equal to the L2 distance up to a constant and a scalar $$\left(\text{e.g., } \|z_{img} - z_{txt}\|2 = 2 - 2 * z_{img} \cdot z_{txt}^T\right).$$

Thus, the maximum logit over the classes may be equivalent to the minimum $L_2$ distance over the classes. The minimum distance can be a natural measure of confidence for a prediction. For example, the classic k-means algorithm can use the minimum distance as a measure for clustering.

For potential problems with prompt scoring, if a prompt has large maximum logit values given a set of images, the system may suggest that the zero-shot classifier is more confident in the predictions, and therefore the classification may be more likely that the prompt is suitable for the image classification task. Thus, the system may consider Process 1 for using the maximum logit (averaged over images) for scoring prompts.

Process 1 Max Logit Scoring

1: Input: Image embeddings $Z_{img}$ (shape N × D), class embeddings for the $p^{th}$ prompt $Z_{txt}$ (shape C × D).
2: logits = $Z_{img} \cdot Z_{txt}^T$ # shape: N × C.
3: max_logits = $\max_c$ logits # shape: N .
4: $s_p = \frac{1}{N}\sum_{n=1}^{N} \text{max\_logits}_n$
5: Output: $s_p$, the score for the $p^{th}$ prompt.

In some implementations, the scoring method can be biased. The biases can be seen by looking at the top 10 prompts for ImageNet and Sun397:

ImageNet:

a example of a person practicing { }. • a example of a person using { }. • a cropped photo of a { }. • a photo of the { }. • a photo of the small { }. • a cropped photo of the { }. • a photo of the large { }. • a example of the person { }. • a example of a person { }. • a example of { }.

SUN397:

a photo of { }. • a photo of the { }. • a cropped photo of a { }. • a example of { }. • a example of the person { }. • an example of { }. • a example of a person { }. • a photo of a large { }. • a photo of the large { }. • a cropped photo of the { }.

Some prompts (e.g., the prompts including the word 'person') may be scored highly even though these prompts are not related to the classes of either dataset. By considering the contrastive training of the model, the system can identify two or more pathologies that might cause the bias. Prompts may be biased towards large logits due to word frequency bias in pre- training data and/or spurious concept frequency bias in test data.

Word frequency bias in pre-training data can include instances when prompts include words, or words with similar semantic meanings to those, that appear more frequently in the pre-training data. Spurious concept frequency bias in test data can include instances when prompts include frequent words that map to common concepts in the test images, but that are different to the classes of interest for prediction. For example, images in Sun397 can include people but the classes may include various in- and outdoor locations.

In some implementations, the raw max logit score may be not trustworthy because the value can be overconfident due to the biases.

To correct for these potential frequency biases, the systems and methods may normalize the raw max logits score by subtracting the expected value under a reference distribution. The systems and methods may use subtraction rather than division for normalization, because the scoring method may be working in log (odds) space.

Given a pair of a test image and a prompt, the system can compare the maximum logit for the pair logits(test_img, prompt) with the expected maximum logit for a random image with the same prompt logits(random_img, prompt). If the prompt includes frequent words in the pre-training data or words that map to unrelated but common concepts in the test data and result in large logits regardless of the content of an image, the expected maximum logit value may be large too. Therefore when the difference logits (img, prompt)−logits(random_img, prompt) is large, the prompt may be considered suitable to the classification task of the test image.

The system may solve word frequency bias by normalizing the logits for each prompt by subtracting the expected logits based on images in the pre-training data $E_{pretrain}=E_{img}\sim D_{pretrain}\,[z_{img}\cdot z_{txt}]$. The system can estimate the expected logits using the average logits for a wide range of random images sampled from the pre-training data. In some implementations, the model may be trained on LAION400m (Schuhmann et al., "LAION-400M: open dataset of CLIP-filtered 400 million image-text pairs," CoRR, abs/2111.02114, 2021.). By removing $E_{pre\text{-}train}$, the system may down-weigh prompts that can include the frequent words in the pre-training data which may result in large logits regardless of the content of an image. In the experiments, the system may use a small subsample of LAION400m (e.g., the first 20 k images) as the subsample may be sufficient to achieve high performance.

The result can be verified by subtracting $E_{pretrain}$ from the logits that reduces the word frequency bias. In some implementations, the system can compare the correlation coefficient for the frequency of each word in LAION400m and the average logit avg_logit=$E_{img}\sim D_{imagNet}\,[z_{img}\cdot z_{word}]$ with the correlation between the word frequency and avg_logit−$E_{pretrain}$. Without normalisation the system may have a Pearson correlation coefficient of 0.09 with a p-value of 3.6×10−11. With normalization, the system can have a correlation coefficient of −0.03 with a p-value of 0.03. Subtracting $E_{pretrain}$ can remove the statistically significant correlation between logit magnitude and word frequency.

The systems and methods may solve spurious concept frequency bias by subtracting the expected logits for the images in the test data $E_{test}=E_{img}\sim D_{test}\,[z_{img}\cdot z_{txt}]$. Common concepts can be shared among test images, averaging the logits may provide a good reference of the maximum logit value for a general image containing the concepts. By removing $E_{test}$, the system can down-weigh prompts that include words that map to common but spurious concepts.

To jointly reduce the both types of biases, the systems and methods can average over $E_{pretrain}$ and $E_{test}$. For example, Process 2 can show the method for scoring prompts with normalization.

Process 2 Normalized Max Logit Scoring

---

1: Input: Image embeddings $Z_{img}$ (shape N × D), class embeddings for the $p^{th}$ prompt $Z_{txt}$ (shape C × D), embeddings of pre-train images $Z_{pretrain}$ (shape N' × D).

2: $\text{logits} = Z_{img} \cdot Z_{txt}^T$ # shape: N × C.

3: $\text{logits}_{pretrain} = Z_{pretrain} \cdot Z_{txt}^T$ # shape: N' × C.

4: $$E_{pretrain} = \frac{1}{N'}\sum_{n=1}^{N'} logits_{pretrain,n}$$

5: $$E_{test} = \frac{1}{N}\sum_{n=1}^{N} logits_n$$

6: $\text{logits}_{normalized} = \text{logits} - (E_{pretrain} + E_{test})/2$

7: $\text{max\_logits} = \max_c \text{logits}_{normalized}$ # shape: N .

8: $$s_p = \frac{1}{N}\sum_{n=1}^{N} \text{max\_logits}_n$$

9: Output: $s_p$, the score for the $p^{th}$ prompt.

---

In some implementations, the systems and methods can handle long-tails via softmax weighting. When scoring a large number of prompts, a long tail behavior may be observed, where a small number of prompts have large scores, but some prompts may be "bad" and have small scores. Despite receiving small scores, the irrelevant prompts may collectively provide a large impact on the weighted average in (3). To mitigate the issue, the system replace (3) with $$c = \text{argmax}\frac{1}{P}\sum_{p=1}^{P} \text{logits}_p \times \text{softmax}(s)_p. \tag{5}$$

The softmax function may be applied over the prompt sets such that the weights are summed to 1.

In some implementations, the systems and methods can include conditioned and/or automatically determined prompt selection. In some implementations, principled normalization techniques can be utilized for countering the frequency biases in pre-training and test data and the long-tail issue in computing prompt scores sp for the weighted ensemble (3). For computing the masked ensemble (4), the systems and methods may utilize to set the score threshold parameter τ. In a large pool of prompts, some of the prompts may be irrelevant to a specific downstream dataset. The relevant prompts can be regarded as outliers to the pool distribution. In some implementations, the system can use the median absolute deviation test statistic which can be similar to using a z-test statistic but can be more robust to extreme events and non-Gaussian distributions. Concretely, the system can calculate the median $\bar{s}=\text{median}_p\,(s)$ and median absolute deviation $\tilde{d}=\text{median}_p\,(|s-\bar{s}|)$. The systems and methods can then compute the z-score for given a prompt, $$z = \frac{s - \bar{s}}{\tilde{d}}$$

The system can classify the pth prompt as an outlier if $z_p > \tau$. Here, τ can be analogous to a desired standard deviation in a z-test. The advantage of the approach, rather than thresholding the scores directly, can be that the system can set τ without knowledge of the magnitudes of the scores, which can allow the system to use the same value of τ for multiple datasets.

To evaluate the quality of the prompt scores, the zero-shot prompt ensembling (ZPE) method can be compared to a number of baselines. Various ablation and sensitivity studies can be performed. The evaluated systems, unless specified, can use score normalization and softmax weighting. The methods can be evaluated on ImageNet (Russakovsky et al., "ImageNet large scale visual recognition challenge," Int. J. Comput. Vis., 115 (3):211-252, 2015.), and its variant test sets ImageNet-R, ImageNet-A, ImageNet-Sketch, and ImageNet-V2 (Hendrycks et al., "Natural adversarial examples," In CVPR, pp. 15262-15271, Computer Vision Foundation/IEEE, 2021b.; Wang et al., "Learning robust global representations by penalizing local predictive power," In Wallach et al. (eds.), NeurIPS, pp. 10506-10518, 2019; Recht et al., "Do imageNet classifiers generalize to imageNet?" In Chaudhuri et al. (eds.), ICML, volume 97 of Proceedings of Machine Learning Research, pp. 5389-5400, PMLR, 2019). The various systems can be evaluated on Caltech 101, Cars196, CIFAR10, CIFAR100, DTD, EuroSat, Food-101, Oxford flowers, Oxford pets, Resisc45, and Sun397 which can be fine-grained classification datasets covering several different domains.

The CLIP results (e.g., rows 1-3 in Tables 1 and 2) can differ from those presented by Radford et al. (2021). This may be due to two factors. Firstly, in several cases—e.g., for the Caltech101 dataset—Radford et al. (2021) may not specify the dataset split they used. Thus, the evaluation can include making guesses which do not necessarily agree with their choices. Secondly, the evaluations have shown that the implementation of resize in tensorflow datasets, which can be used for data pre-processing, can differ slightly from the torchvision implementation used by Radford et al. (2021). The implementation difference may cause large differences in performance for some datasets.

The systems and methods can include creating a pool of prompts. In some implementations, the systems and methods can have a varied pool of thousands of hand-crafted prompts. Such a set of prompts may include a range of generic prompts—such as 'A photo of { }.' and 'An example of { }.'—that may be useful for a many classification tasks, as well as more specific prompts—such as 'A photo of { }, a type of flower.' and 'A cartoon of { }.'—that may be expected to be useful for a smaller range of tasks.

In the following experiments, the evaluation can include simulating such a pool by combining the 27 sets of prompts designed by Radford et al. (2021) and the prompts designed for 14 datasets by Zhai et al. (2022). This can leave the evaluation with a pool of 247 unique prompts. In some implementations, the evaluation can leverage a large language model to generate 179 additional prompt templates, resulting in a pool of 426 total templates. The evaluation process can then use the to study the impact of the size of the pool set on performance.

TABLE 1 can depict zero-shot accuracy on ImageNet and its variants. ZPE can be applied to the pool set. The hand-crafted prompt sets may be highly optimized and manually tuned on labeled validation sets, while the method ZPE can be automatic and cheap to compute.

| | IMAGENET | IMAGENET-A | IMAGENET-R | IMAGENET-SKETCH | IMAGENET-V2 | AVG |
|---|---|---|---|---|---|---|
| | | | CLIP ViT-B/16 | | | |
| class name | 63.94 | 46.01 | 74.92 | 44.12 | 57.97 | 57.39 |
| 'A photo of { }.' | 66.37 | 47.47 | 73.78 | 45.84 | 60.46 | 58.78 |
| hand-crafted, equal average | 68.31 | 49.13 | 77.31 | 47.65 | 61.83 | 60.85 |
| pool set, equal average | 67.59 | 49.35 | 77.33 | 46.92 | 61.37 | 60.51 |
| max-logit scoring | 67.63 | 49.37 | 77.38 | 46.95 | 61.39 | 60.55 |
| ZPE (weighted average) | 68.56 | 49.61 | 77.69 | 47.92 | 62.23 | 61.2 |
| ZPE (prompt selection, ours) | 68.6 | 49.63 | 77.62 | 47.99 | 62.21 | 61.21 |
| | | | LiT ViT-L/16 | | | |
| class name | 78.26 | 62.36 | 89.8 | 64.24 | 71.61 | 73.26 |
| 'A photo of { }.' | 78.22 | 62.43 | 89.45 | 63.73 | 71.35 | 73.03 |
| hand-crafted, equal average | 78.55 | 63.09 | 90.52 | 64.9 | 72.1 | 73.83 |
| pool set, equal average | 77.49 | 62.07 | 90.25 | 63.49 | 71.17 | 72.89 |
| max-logit scoring | 77.86 | 62.31 | 90.47 | 63.94 | 71.31 | 73.18 |
| ZPE (weighted average) | 78.9 | 63.6 | 90.85 | 65.58 | 72.43 | 74.27 |
| ZPE (prompt selection, ours) | 79.26 | 63.95 | 90.91 | 65.61 | 72.59 | 74.46 |

Table 2 can depict zero-shot accuracy on fine-grained classification tasks. ZPE can be applied to the pool set.

| | CALTECH | CARS | C-10 | C-100 | DTD |
|---|---|---|---|---|---|
| | | CLIP ViT-B/16 | | | |
| class name | 77.84 | 61.6 | 87.3 | 58.59 | 44.04 |
| 'A photo of {}.' | 82.73 | 63.45 | 88.36 | 65.49 | 42.93 |
| hand-crafted, equal average | 82.82 | 64.17 | 89.1 | 65.9 | 45.64 |
| pool set, equal average | 83.6 | 63.16 | 89.56 | 65.56 | 45.96 |
| max-logit scoring | 83.56 | 63.16 | 89.55 | 65.53 | 46.28 |
| ZPE (weighted average) | 84.68 | 64.13 | 89.34 | 66.4 | 46.54 |
| ZPE (prompt selection, ours) | 85.54 | 64.62 | 89.3 | 66.63 | 46.28 |
| | | LiT ViT-L/16 | | | |
| class name | 83.5 | 90.36 | 94.86 | 76.04 | 55.8 |
| 'A photo of {}.' | 84.5 | 82.07 | 96.33 | 77.25 | 56.44 |
| hand-crafted, equal | 83.04 | 86.43 | 95.54 | 78.32 | 60.59 |

-continued

| | | | | | |
|---|---|---|---|---|---|
| average pool set, equal average | 83.76 | 89.12 | 95.64 | 78.3 | 57.77 |
| max-logit scoring | 84.02 | 89.14 | 95.64 | 78.28 | 58.35 |
| ZPE (weighted average) | 84.86 | 90.05 | 95.93 | 78.98 | 59.47 |
| ZPE (prompt selection, ours) | 85.55 | 90.57 | 96.36 | 79.36 | 60.05 |

| | EURO | FOOD | FLOWERS | PETS | RESISC | SUN | AVG |
|---|---|---|---|---|---|---|---|
| CLIP ViT-B/16 | | | | | | | |
| class name | 46.9 | 86.68 | 63.57 | 81.38 | 53.74 | 60.7 | 65.67 |
| 'A photo of {}.' | 47.85 | 88.19 | 66.84 | 87.74 | 55.96 | 59.95 | 68.13 |
| hand-crafted, equal average | 51.6 | 88.66 | 71.23 | 88.91 | 65.44 | 63.87 | 70.67 |
| pool set, equal average | 54.63 | 87.79 | 63.62 | 80.87 | 58.7 | 65.32 | 68.98 |
| max-logit scoring | 54.48 | 87.81 | 63.7 | 80.87 | 59.02 | 65.39 | 69.03 |
| ZPE (weighted average) | 53.42 | 88.5 | 67.64 | 86.81 | 64.18 | 66.15 | 70.71 |
| ZPE (prompt selection, ours) | 53.82 | 88.61 | 70.17 | 88.72 | 64.22 | 64.7 | 71.15 |
| LiT ViT-L/16 | | | | | | | |
| class name | 25.78 | 93.45 | 78.71 | 94.74 | 52.46 | 69.97 | 74.15 |
| 'A photo of {}.' | 38.97 | 93.1 | 80.16 | 93.38 | 57.08 | 70.65 | 75.45 |
| hand-crafted, equal average | 52.19 | 93 | 79.3 | 93.51 | 63.89 | 69.26 | 77.73 |
| pool set, equal average | 41.55 | 92.65 | 73.28 | 90.22 | 58.01 | 71.13 | 75.58 |
| max-logit scoring | 42.11 | 92.7 | 73.52 | 91.03 | 58.64 | 71.26 | 75.88 |
| ZPE (weighted average) | 48.69 | 93.12 | 77.75 | 93.49 | 62.7 | 72.26 | 77.94 |
| ZPE (prompt selection, ours) | 51.42 | 93.32 | 79.96 | 93.57 | 62.93 | 72.67 | 78.71 |

The systems and methods can include a ZPE weighted average. Tables 1 and 2 can show the results for using ZPE weighted averaging on our pool of prompts for ImageNet and its variants, and the fine-grained classification tasks, respectively. On the ImageNet tasks, the evaluation results can show that ZPE outperforms the hand-crafted prompts across the board. On the other hand, for the fine-grained classification tasks, performance may be more mixed. For CIFAR10 and EuroSat the best performing method may be an equal weighting of all of the pool prompts. Nonetheless, ZPE can beat the hand-crafted prompts on 6 of the 11 datasets, for both CLIP and LIT, performed best or second best in most cases, and performed slightly better than the hand-crafted prompts on average. ZPE can perform better than naive max-logit scoring in some cases and on average. For CLIP ViT-B/16 and LiT ViT-L/16, averaging accuracy for all 11 fine-grained datasets, ImageNet, and its four variants, ZPE can give 67.44% versus 66.06% of the equal-average pool-set, and 76.79% versus 74.74%, respectively. Comparing with a strong base-line of the hand-crafted prompts that may be manually tuned over a year, which can have average accuracies of 67.29% and 76.51% for CLIP ViT-B/16 and LiT ViT-L/16, respectively, ZPE may also perform better.

Examining the top-10 prompts for ImageNet-R and Resisc45, the results can show that the scores may make sense given the content of the images.

ImageNet-R:

a drawing of a { }. • a drawing of the { }. • itap of a { }. • a sketch of a { }. • a embroidered { }. • a painting of a { }. • itap of my { }. • a doodle of a {}. • a painting of the { }. 'itap of the { }. •

Resisc45:

satellite view of a { }. • satellite view of the { }. • satellite view of { }. • satellite photo of a { }. • satellite photo of the { }. • a centered satellite photo of a { }. • a satellite image of { }. • of { }. • a centered satellite photo of the { }. • a satellite photo of { }.

In addition to using the softmax function to down-weight the bad prompts using (5), the systems and methods can select a set of top prompts and use (4) for prompt ensembling. For prompt selection, the system may choose a proper hyper-parameter τ. For ImageNet and its variants, since the dataset contains a large set of diverse classes, a diverse set of prompts may be relied on for good performance, while for the fine-grained datasets, less diverse but more domain specific prompts fit the task better. Therefore, the evaluation can use τ=0.5 for ImageNet and its variants, and τ=2.0 for all fine-grained datasets. The values may be chosen by sweeping over τ∈{0.1, 0.2, 0.3, 0.4, 0.5, 1.0, 1.5, 1.8, 2.0, 2.5} and choosing the best values according to the average classification performance across datasets.

Tables 1 and 2 can provide comparisons between the presently disclosed prompt selection and weighted average methods, for the ImageNet (with variants) and fine-grained classification tasks, respectively. The results may convey that for ImageNet and variants, both methods perform very similarly, with the prompt selection providing slightly better results on average. On the other hand, for the fine-grained tasks, prompt selection may be better on 8 and all of the 11 datasets, for CLIP ViT-B/16 and LiT ViT-L/16 respectively. The results may depict that the average accuracy is higher by a more significant margin for both models. The result may convey that fine-grained tasks will need fewer prompts than general tasks like ImageNet, and may thus benefit more from prompt selection. For CLIP ViT-B/16 and LiT ViT-L/16, averaging accuracy for all of our datasets, comparing ZPE prompt selection and the equal-average pool-set can give 67.73% versus 66.06% and 77.38% versus 74.74%, respectively. Comparing with the strong baseline of hand-crafted prompts—with 67.29%, and 76.51% on average for CLIP ViT-B/16 and LiT ViT-L/16, respectively—ZPE performs better again.

Table 3 can compare zero-shot performance for various normalization schemes. The results can show that the combination of $E_{pretrain}$ and $E_{test}$ normalization may work best in some cases, providing a 0.54% and 0.61% average increase in zero-shot accuracy compared to no normalization, for the weighted average and prompt selection, respectively. The results may convey that while $E_{pretrain}$ normalization does not seem to hurt aggregate performance in some cases, $E_{test}$ normalization performed in isolation may hurt, despite helping when combined with $E_{pretrain}$. Finally, the study investigates a variant of $E_{pretrain}$ normalization in which the system removed the impact of the class names by taking the expectation over both the images and classes. However, the scheme may tend to perform worse than image-only normalization.

Table 3 can depict an ablation study for normalization schemes. Zero-shot accuracy for CLIP ViT-B/16 on ImageNet, as well as on average for the ImageNet variants, the fine-grained classification datasets, and all of our datasets.

$$E^*_{pretrain}$$

can be a variant in which the system may take the expectation over both the images and classes.

| | INET | VARIANTS | FINE | ALL |
|---|---|---|---|---|
| weighted average | | | | |
| none | 68.17 | 59.3 | 69.99 | 66.92 |
| E_pretrain | 68.64 | 59.31 | 70.7 | 67.42 |
| E*_pretrain | 68.62 | 59.31 | 70.33 | 67.17 |
| E_test | 68.45 | 59.23 | 70.11 | 67 |
| both (ZPE) | 68.56 | 59.36 | 70.71 | 67.44 |
| prompt selection | | | | |
| none | 68.24 | 59.37 | 70.3 | 67.15 |
| E_pretrain | 68.64 | 59.25 | 71.13 | 67.69 |
| E*_pretrain | 68.66 | 59.26 | 70.67 | 67.39 |
| E_test | 68.54 | 59.1 | 70.29 | 67.09 |
| both (ZPE) | 68.6 | 59.36 | 71.15 | 67.73 |

Table 4 can compare zero-shot performance for three weighting schemes. The results can show that the method of taking the softmax of the scores may provide the best performance on average, and may perform better than using the raw scores, particularly in the weighted average case.

TABLE 4 can depict an ablation study for weighting schemes. Zero-shot accuracy for CLIP ViT-B/16 on ImageNet, as well as on average for the ImageNet variants, the fine-grained classification datasets, and all of our datasets.

| | INET | VARIANTS | FINE | ALL |
|---|---|---|---|---|
| weighted average | | | | |
| scores | 67.74 | 58.79 | 69.13 | 66.18 |
| scores10 | 68.35 | 59.32 | 70.55 | 67.3 |
| softmax (ZPE) | 68.56 | 59.36 | 70.71 | 67.44 |
| prompt selection | | | | |
| scores | 68.55 | 59.31 | 71.12 | 67.7 |
| scores10 | 68.61 | 59.37 | 71.13 | 67.72 |
| softmax (ZPE) | 68.6 | 59.36 | 71.15 | 67.73 |

Model architecture sensitivity can be evaluated to gauge the sensitivity of the method to the architecture of the underlying text-image model. Table 5 can show performance of ZPE relative to hand-crafted prompts, for a range of CLIP and LiT model architectures. The results can show that ZPE, especially with prompt selection, can improve on the equal-average pool-set baseline and the hand-crafted prompts, performing better on average in some cases. Since the hand-crafted prompts may have been designed for CLIP rather than LiT, the ZPE may provide larger performance gains for the LiT models. This can showcase a key benefit of the method, namely that the system disclosed herein can avoid the need to hand-tune the set of prompts for each task and model.

The impact of the size of the pool set on performance can be evaluated. The evaluation can utilize a generative language model to generate additional 179 prompts, which can result in a total of 427 prompts. The results can show that ZPE may outperform the hand-crafted equal-average method. The effect of the number of random images can be used for estimating $E_{image}$~$D_{pretrain}$ and the number of test images used for estimating $E_{image}$~$D_{text}$. The results can show that ZPE may be very robust to those sample sizes. ZPE scores can be reliably estimated using as few as 5 k random images and as little as 10% of test data.

TABLE 5 can depict an ablation study for different kinds of text-image models. Zero-shot accuracy on ImageNet, as well as on average for the ImageNet variants, the fine-grained classification datasets, and all of the datasets.

| | INET | VARIANTS | FINE | ALL |
|---|---|---|---|---|
| **CLIP ResNet-50** | | | | |
| hand-crafted, equal average | 59.48 | 42.52 | 59.36 | 55.15 |
| pool set, equal average | 58.24 | 42.17 | 56.04 | 52.71 |
| ZPE (weighted average) | 59.68 | 42.97 | 58.79 | 54.89 |
| ZPE (prompt selection, ours) | 59.9 | 42.87 | 59.64 | 55.46 |
| **CLIP ResNet-101** | | | | |
| hand-crafted, equal average | 62.47 | 48.57 | 62.33 | 58.9 |
| pool set, equal average | 61.56 | 48.16 | 59.86 | 57.04 |
| ZPE (weighted average) | 62.66 | 48.81 | 61.92 | 58.69 |
| ZPE (prompt selection, ours) | 62.8 | 48.86 | 62.66 | 59.21 |
| **CLIP ViT-B/32** | | | | |
| hand-crafted, equal average | 62.95 | 49.44 | 67.59 | 62.76 |
| pool set, equal average | 61.73 | 48.97 | 65.34 | 61.02 |
| ZPE (weighted average) | 63.16 | 49.66 | 67.69 | 62.9 |
| ZPE (prompt selection, ours) | 63.31 | 49.76 | 68.05 | 63.18 |
| **CLIP ViT-B/16** | | | | |
| hand-crafted, equal average | 68.31 | 58.98 | 70.67 | 67.29 |
| pool set, equal average | 67.59 | 58.74 | 68.98 | 66.06 |
| ZPE (weighted average) | 68.56 | 59.36 | 70.71 | 67.44 |
| ZPE (prompt selection, ours) | 68.6 | 59.36 | 71.15 | 67.73 |
| **CLIP ViT-L/14** | | | | |
| hand-crafted, equal average | 75.36 | 71.72 | 77.4 | 75.85 |
| pool set, equal average | 74.77 | 71.41 | 74.6 | 73.82 |
| ZPE (weighted average) | 75.58 | 72.01 | 77.18 | 75.79 |
| ZPE (prompt selection, ours) | 75.62 | 72.02 | 77.67 | 76.13 |
| **LIT ViT-B/32** | | | | |
| hand-crafted, equal average | 68.13 | 55.25 | 70.19 | 66.33 |
| pool set, equal average | 66.93 | 54.51 | 68.55 | 64.94 |
| ZPE (weighted average) | 68.6 | 55.67 | 70.81 | 66.89 |
| ZPE (prompt selection, ours) | 68.88 | 55.72 | 71.78 | 67.58 |
| **LiT ViT-B/16** | | | | |
| hand-crafted, equal average | 73.24 | 64.61 | 73.03 | 70.94 |
| pool set, equal average | 72.29 | 63.7 | 70.47 | 68.89 |
| ZPE (weighted average) | 73.93 | 64.95 | 73.17 | 71.16 |
| ZPE (prompt selection, ours) | 74.02 | 65.14 | 73.88 | 71.71 |

TABLE 5-continued can depict an ablation study for different kinds of text-image models. Zero-shot accuracy on ImageNet, as well as on average for the ImageNet variants, the fine-grained classification datasets, and all of the datasets.

| | INET | VARIANTS | FINE | ALL |
|---|---|---|---|---|
| **LiT ViT-L/16** | | | | |
| hand-crafted, equal average | 78.55 | 72.65 | 77.73 | 76.51 |
| pool set, equal average | 77.49 | 71.74 | 75.58 | 74.74 |
| ZPE (weighted average) | 78.9 | 73.11 | 77.94 | 76.79 |
| ZPE (prompt selection, ours) | 79.26 | 73.27 | 78.71 | 77.38 |

The systems and methods can include zero-shot prompt ensembling, a technique for improving the zero-shot accuracy of text-image models without the need for manual prompt engineering. In some implementations, the systems and methods can outperform the equal-average pool-set baseline and even the strong baseline of hand-crafted prompts, while remaining simple to implement—with no training required—and essentially free to apply. Additionally and/or alternatively, the systems and methods can construct a large and varied pool of high-quality prompt templates. In some implementations, the systems and methods may score prompts individually and/or in combinations. Scoring can be done per dataset rather than per image. However, a prompt that may be good for one image might not be useful for another. For example, 'A photo of a { }, a type of cat.' would likely not be useful for an image of a dog. In some implementations, the systems and methods can leverage per-example scoring to improve performance. Alternatively and/or additionally, a small amount of labeled data (e.g., in a few-shot setting) to select prompts may be utilized.

The impact of the size of the pool set on performance can be evaluated. The evaluation can use two additional pools of prompts. The first can be the set of 80 prompts designed by Radford et al. (2021) for ImageNet. The second set can be constructed by using an autoregressive language model to create additional prompts by filling in the following templates:

- 'A photo of a { }, a type of XXX.', where XXX was replaced with categories of objects that could be found in a photo, for example 'insect', 'fish', and 'tree',
- 'A YYY photo of a { }.', where YYY was replaced with adjectives that could describe an image, for example 'panoramic', 'close-up', and 'wide-angle',
- 'A ZZZ of a { }.', where ZZZ was replaced with different mediums, for example 'print', 'engraving', and 'etching'.

The system can generate an additional 179 prompt templates which resulted in a pool of 426 total templates.

Table 6 can show the performance of ZPE with the different prompt pools. In both the weighted average and prompt selection cases, the results can show that the additional prompts reduce the average performance below 247-prompt pool but not below the 80-prompt pool. The 80-prompt pool can perform well on ImageNet but less well on the fine-grained datasets. The 80-prompt poll may appear to not have enough diverse prompts, while the 179 generated prompts in 426-prompt pool may appear to bring the quality of the pool down. In some instances, ZPE can perform competitively or better than the equal-average hand-crafted prompts. ZPE scores can improve the performance of the hand designed prompts. The results can show that ZPE weighting outperforms the naive weighting of the hand designed prompts. Considering that the hand-crafted prompts can be highly optimized and that ZPE can be automatic and cheap to compute, providing a performance boost almost for free, the improvements can be substantial.

TABLE 6 can depict a ZPE sensitivity to pool size. Zero-shot accuracy for CLIP ViT-B/16 on ImageNet, as well as on average for the ImageNet variants, the fine-grained classification datasets, and all of our datasets. The table can indicate that ZPE performs worse than the hand-crafted prompts.

| | INET | VARIANTS | FINE | ALL |
|---|---|---|---|---|
| hand-crafted, equal average | 68.31 | 58.98 | 70.67 | 67.29 |
| hand-crafted, ZPE weights | 68.57 | 59.26 | 70.74 | 67.43 |
| weighted average | | | | |
| ZPE (80 prompts) | 68.57 | 59.26 | 70.29 | 67.13 |
| ZPE (247 prompts) | 68.56 | 59.36 | 70.71 | 67.44 |
| ZPE (426 prompts) | 68.4 | 59.24 | 70.54 | 67.3 |
| prompt selection | | | | |
| ZPE (80 prompts) | 68.38 | 59.08 | 70.58 | 67.26 |
| ZPE (247 prompts) | 68.6 | 59.36 | 71.15 | 67.73 |
| ZPE (426 prompts) | 68.37 | 59.21 | 70.96 | 67.54 |

To de-bias the scores, the system may use a set of random images that cover a wide range of natural images such that the system may have an accurate approximation for $E_{image}{\sim}D_{pretrain}$ $[z_{img}{\cdot}z_{txt}]$. The sensitivity of ZPE to the number of images used to approximate the expectation can be evaluated.

Table 7 can compare the performance with first 5 k, 10 k, and 20 k images from the LAION400m dataset (Schuhmann et al., 2021). The results can show that ZPE can be very robust to the number of random images.

TABLE 7 can depict a ZPE sensitivity to the number of random images used for estimating $E_{image} \sim D_{pretrain}$. Zero-shot accuracy for CLIP ViT-B/16 on ImageNet, as well as on average for the ImageNet variants, the fine-grained classification datasets, and all of the datasets.

| | INET | VARIANTS | FINE | ALL |
|---|---|---|---|---|
| weighted average | | | | |
| 5k | 68.55 | 59.36 | 70.71 | 67.44 |
| 10k | 68.56 | 59.36 | 70.71 | 67.44 |
| 20k | 68.56 | 59.36 | 70.71 | 67.44 |
| prompt selection | | | | |
| 5k | 68.6 | 59.37 | 71.15 | 67.74 |
| 10k | 68.6 | 59.37 | 71.15 | 67.73 |
| 20k | 68.6 | 59.36 | 71.15 | 67.73 |

The evaluation can include the system using all the images in the test dataset to estimate $E_{image}{\sim}D_{test}$ $[z_{img}{\cdot}z_{txt}]$. The evaluation can study how sensitive is the estimation to the test sample size. Instead of using all images in the test set, the system may use 10%, 20%, 50% of the test samples to estimate $E_{image}{\sim}D_{test}$. Table 8 can show the zero-shot classification accuracy when using partial test dataset. The results can show that ZPE can be very robust to the number of test images used for score estimation.

TABLE 8 can depict a ZPE sensitivity to the percentage of test images used for estimating $E_{image} \sim D_{test}$. Zero-shot accuracy for CLIP ViT-B/16 on ImageNet, as well as on average for the ImageNet variants, the fine-grained classification datasets, and all of our datasets.

| | INET | VARIANTS | FINE | ALL |
|---|---|---|---|---|
| weighted average | | | | |
| 10% | 68.55 | 59.35 | 70.71 | 67.44 |
| 20% | 68.56 | 59.36 | 70.71 | 67.44 |
| 50% | 68.56 | 59.36 | 70.71 | 67.44 |
| 100% | 68.56 | 59.36 | 70.71 | 67.44 |
| prompt selection | | | | |
| 10% | 68.59 | 59.39 | 71.16 | 67.75 |
| 20% | 68.6 | 59.37 | 71.12 | 67.72 |
| 50% | 68.6 | 59.37 | 71.15 | 67.74 |
| 100% | 68.6 | 59.36 | 71.15 | 67.73 |

Table 9 can compare the performance of per-example scoring with per-dataset scoring (e.g., as used for the results in the main text). In the case of the hand-crafted prompts, the results can show that per-dataset scoring can perform better. However, the per-example scoring may perform better than the equal average.

On the other hand, for the pool set, the results can show that the per-example scoring can perform better than per-dataset in some cases, and indeed, on average. In particular, per-example can appear to work better for the fine-grained classification datasets.

Softmax scoring and normalization can be important for per-example scores, the removal can be less impactful than in the per-dataset case.

TABLE 9 can depict results for per-example scoring. Zero-shot accuracy for CLIP ViT-B/16 on ImageNet, as well as on average for the ImageNet variants, the fine-grained classification datasets, and all of the datasets.

| | INET | VARIANTS | FINE | ALL |
|---|---|---|---|---|
| hand crafted, equal average | 68.31 | 58.98 | 70.67 | 67.29 |
| hand crafted, ZPE weights, per-dataset | 68.57 | 59.26 | 70.74 | 67.43 |
| hand crafted, ZPE weights, per-example | 68.11 | 59.1 | 70.67 | 67.31 |
| pool set, equal average | 67.59 | 58.74 | 68.98 | 66.06 |
| pool set, ZPE weights, per-dataset | 68.56 | 59.36 | 70.71 | 67.44 |
| pool set, ZPE weights, per-example | 67.97 | 59.34 | 71.01 | 67.6 |
| pool set, ZPE weights, per-dataset, no softmax | 67.74 | 58.79 | 69.13 | 66.18 |
| pool set, ZPE weights, per-example, no softmax | 67.84 | 58.88 | 69.37 | 66.37 |
| pool set, ZPE weights, per-dataset, no norm | 68.17 | 59.3 | 69.99 | 66.92 |

TABLE 9-continued can depict results for per-example scoring. Zero-shot accuracy for CLIP ViT-B/16 on ImageNet, as well as on average for the ImageNet variants, the fine-grained classification datasets, and all of the datasets.

| | INET | VARIANTS | FINE | ALL |
|---|---|---|---|---|
| pool set, ZPE weights, per-example, no norm | 67.92 | 59.4 | 70.71 | 67.42 |

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, the system comprising:
- one or more processors; and
- one or more non-transitory computer-readable media that collectively store instructions that, when executed by the one or more processors, cause the computing system to perform operations, the operations comprising:
  - obtaining an image and a plurality of candidate text labels, wherein the plurality of candidate text labels are associated with a particular image classification task;
  - obtaining a plurality of prompts, wherein the plurality of prompts are associated with a phrase to provide with a classification output;
  - processing the image with an image embedding model to generate an image embedding;
  - processing each of the plurality of candidate text labels with each of the plurality of prompts with a text embedding model to generate a plurality of text embedding sets, wherein each text embedding set is associated with a different prompt of the plurality of prompts, and wherein the each text embedding set comprises a plurality of text embeddings, each text embedding comprising a particular text embedding associated with a particular candidate text label of the plurality of candidate text labels;
  - determining a score for each respective prompt of the plurality of prompts based on text embeddings in a text embedding set of a respective prompt and the image embedding;
  - generating a plurality of weighted text representations based on the plurality of text embeddings sets and the plurality of respective scores, wherein each weighted text representation is associated with a respective prompt of the plurality of prompts and a respective candidate text label of the plurality of candidate text labels, wherein the each weighted text representation is weighted based on a respective score for the respective prompt of the plurality of prompts; and
  - determining an image classification based on the plurality of weighted text representations and the image embedding, wherein the image classification comprises a selected candidate text label of the plurality of candidate text labels.

2. The system of claim 1, wherein determining the score for each respective prompt of the plurality of prompts comprises:
- determining a similarity measure between a text embedding set of a respective prompt and the image embedding.

3. The system of claim 2, wherein the similarity measure comprises an average embedding similarity between the text embeddings of the text embedding set and the image embedding.

4. The system of claim 1, wherein determining the score for each respective prompt of the plurality of prompts comprises:
- obtaining a control image, wherein the control image differs from the image;
- processing the control image with the image embedding model to generate a control image embedding; and
- wherein the score is generated based on the image embedding, the control image embedding, and a respective text embedding set for the respective prompt.

5. The system of claim 1, wherein the operations further comprise:
- obtaining a pre-trained image-text model, wherein the pre-trained image-text model comprises a foundation model pre-trained on a training dataset without a specific downstream task, and wherein the pre-trained image-text model comprises the text embedding model and the image embedding model.

6. The system of claim 5, wherein the training dataset comprises a plurality of image-caption training examples.

7. The system of claim 1, wherein the operations further comprise:
- providing the image classification as an output.

8. The system of claim 1, wherein the plurality of prompts comprise a plurality of caption templates.

9. The system of claim 8, wherein the plurality of caption templates are configured to be augmented to comprise a classification label and be descriptive of an example caption for an input image.

10. The system of claim 1, wherein the plurality of candidate text labels are descriptive of a plurality of candidate object classifications.

11. A computer-implemented method, the method comprising:

obtaining, by a computing system comprising one or more processors, input data, wherein the input data is descriptive of one or more images;

obtaining, by the computing system, a plurality of candidate text labels and a plurality of prompts, wherein the plurality of candidate text labels are descriptive of a plurality of candidate classifications;

generating, by the computing system, a plurality of text strings based on the plurality of candidate text labels and the plurality of prompts, wherein each of the plurality of text strings are generated by augmenting a respective prompt of the plurality of prompts with a candidate text label of the plurality of candidate text labels;

processing, by the computing system, each text string of the plurality of text strings with a text embedding model to generate a plurality of text embedding sets, wherein each text embedding set of the plurality of text embedding sets is associated with a different prompt of the plurality of prompts, and wherein the each text embedding set comprises a plurality of text embeddings, each text embedding comprising a particular text embedding associated with a particular candidate text label of the plurality of candidate text labels;

processing, by the computing system, the input data with an image embedding model to generate an image embedding;

determining, by the computing system, a prompt score for each respective prompt of the plurality of prompts based on text embeddings in a text embedding set of a respective prompt and the image embedding;

generating, by the computing system, a plurality of weighted text embeddings based on respective prompt scores and the plurality of text embeddings, wherein each weighted text embedding is associated with a respective prompt of the plurality of prompts and a respective candidate text label of the plurality of candidate text labels, wherein the each weighted text embedding is weighted based on a respective score for the respective prompt of the plurality of prompts; and determining, by the computing system, a classification output based at least in part on the plurality of weighted text embeddings.

12. The method of claim 11, wherein determining the classification output comprises:

determining, by the computing system, a similarity measure associated with each weighted text embedding of the plurality of weighted text embeddings based on the image embedding and the plurality of weighted text embeddings.

13. The method of claim 11, further comprising:

obtaining, by the computing system, a second prompt, wherein the second prompt differs from the prompt;

generating, by the computing system, a plurality of second weighted text embeddings based on the second prompt and the plurality of text embeddings;

determining, by the computing system, an adjusted text embedding for a particular candidate text label of the plurality of candidate text labels based on a respective weighted text embedding of the plurality of weighted text embeddings and a respective second weighted text embedding of the plurality of second weighted text embeddings; and wherein the classification output is determined based on a similarity measure associated with the adjusted text embedding and the image embedding.

14. The method of claim 11, wherein the text embedding model comprises a text encoder, wherein the image embedding model comprises an image encoder, and wherein the text embedding model and the image embedding model were pre-trained on a training dataset.

15. The method of claim 14, wherein the training dataset comprises a plurality of text-image pairs, wherein each text-image pair comprises an image and a respective caption.

16. The method of claim 14, wherein the text embedding model and the image embedding model were trained based on a bi-directional contrastive loss.

17. One or more non-transitory computer-readable media that collectively store instructions that, when executed by one or more computing devices, cause the one or more computing devices to perform operations, the operations comprising:

obtaining input data, wherein the input data is descriptive of one or more images;

obtaining a plurality of candidate text labels and a plurality of prompts, wherein the plurality of candidate text labels are descriptive of a plurality of candidate classifications;

generating a plurality of text strings based on the plurality of candidate text labels and the plurality of prompts, wherein each of the plurality of text strings are generated by augmenting a respective prompt of the plurality of prompts with a candidate text label of the plurality of candidate text labels;

processing each text string of the plurality of text strings with a text embedding model to generate a plurality of text embedding sets, wherein each text embedding set of the plurality of text embedding sets is associated with a different prompt of the plurality of prompts, and wherein the each text embedding set comprises a plurality of text embeddings, each text embedding comprising a particular text embedding associated with a particular candidate text label of the plurality of candidate text labels;

processing the input data with an image embedding model to generate an input image embedding;

obtaining a control image, wherein the control image differs from the one or more images of the input data;

processing the control image with the image embedding model to generate a control image embedding;

determining a prompt score for each respective prompt of the plurality of prompts based on the input image embedding, the control image embedding, and a plurality of text embeddings in a text embedding set of a respective prompt;

generating a plurality of weighted text embeddings based on the prompt score and the plurality of text embeddings, wherein each weighted text embedding is associated with a respective prompt of the plurality of prompts and a respective candidate text label of the plurality of candidate text labels, wherein the each weighted text embedding is weighted based on a respective score for the respective prompt of the plurality of prompts; and determining a classification output based at least in part on the plurality of weighted text embeddings.

18. The one or more non-transitory computer-readable media of claim 17, wherein determining the prompt score comprises:

determining a first similarity measure based on the input image embedding and the plurality of text embeddings;

determining a second similarity measure based on the control image embedding and the plurality of text embeddings; and determining the prompt score based on a difference between the first similarity measure and the second similarity measure.

19. The one or more non-transitory computer-readable media of claim 17, wherein the plurality of weighted text embeddings are generated based on softmax weighting across a plurality of prompt text embedding sets.

20. The one or more non-transitory computer-readable media of claim 17, wherein the operations further comprise:

generating a plurality of probability predictions for the plurality of candidate text labels based on the plurality of weighted text embeddings and the image embedding; and wherein the classification output is determined based on the plurality of probability predictions.

21. A computing system, the system comprising:

one or more processors; and one or more non-transitory computer-readable media that collectively store instructions that, when executed by the one or more processors, cause the computing system to perform operations, the operations comprising:

obtaining an image;

processing the image with an image embedding model to generate an image embedding;

obtaining a plurality of text embedding sets, wherein the plurality of text embedding sets were generated based on processing a plurality of candidate text labels with a plurality of prompt templates with a text embedding model, wherein each text embedding set is associated with a different prompt template of the plurality of prompt templates, wherein the each text embedding set comprises a plurality of text embeddings;

determining a score for each respective prompt template of the plurality of prompt templates based on text embeddings in a respective text embedding set for the respective prompt template and the image embedding;

generating a plurality of weighted text representations based on the plurality of text embeddings sets and the plurality of respective scores, wherein each weighted text representation is associated with a respective prompt of the plurality of prompts and a respective candidate text label of the plurality of candidate text labels, wherein the each weighted text representation is weighted based on a respective score for the respective prompt template of the plurality of prompt templates; and determining an image classification based on the plurality of weighted text representations and the image embedding, wherein the image classification comprises a selected candidate text label of the plurality of candidate text labels.

* * * * *